United States Patent
Chakrabarty et al.

(10) Patent No.: US 11,568,113 B2
(45) Date of Patent: Jan. 31, 2023

(54) VARIATION-AWARE DELAY FAULT TESTING

(71) Applicant: Duke University, Durham, NC (US)

(72) Inventors: Krishnendu Chakrabarty, Durham, NC (US); Sanmitra Banerjee, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 0 days.

(21) Appl. No.: 17/411,346

(22) Filed: Aug. 25, 2021

(65) Prior Publication Data

US 2022/0067250 A1    Mar. 3, 2022

Related U.S. Application Data

(60) Provisional application No. 63/070,431, filed on Aug. 26, 2020.

(51) Int. Cl.
*G06F 30/31* (2020.01)
*G06F 30/3308* (2020.01)
*G06F 117/06* (2020.01)

(52) U.S. Cl.
CPC .......... *G06F 30/31* (2020.01); *G06F 30/3308* (2020.01); *G06F 2117/06* (2020.01)

(58) Field of Classification Search
CPC ................ G06F 30/31; G06F 30/3308; G06F 30/3312; G06F 2111/08; G06F 2117/06; G06F 2119/12
See application file for complete search history.

(56) References Cited

U.S. PATENT DOCUMENTS 7,535,016 B2    5/2009   Furukawa et al.

FOREIGN PATENT DOCUMENTS

JP     2008-192795 A    8/2008
KR  10-2010-0002842 A    1/2010

OTHER PUBLICATIONS

Albert Lin et al. "A Metallic-CNT-Tolerant Carbon Nanotube Technology Using Asymmetrically-Correlated CNTs (ACCNT)" 2009 Symposium on VLSI Technology Digest of Technical Papers, 2009, 2 pages.
José L. García-Gervacio et al. "A Methodology to Compute the Statistical Fault Coverage of Small Delays due to Opens" Proc. 52nd IEEE Int. Midwest Symp. Circuits Syst., Aug. 2009, 4 pages.

(Continued)

*Primary Examiner* — Jack Chiang
*Assistant Examiner* — Aric Lin
(74) *Attorney, Agent, or Firm* — Talem IP Law, LLP

(57) ABSTRACT

Variation-aware delay fault testing suitable for carbon nanotube field-effect transistor circuits can be accomplished using an electronic design automation tool that performs long path selection by generating random variation scenarios, wherein a random variation scenario (RVS) is an instance of an input netlist where values for a set of process parameters for each gate are chosen from a set of values for each process parameter of the set of process parameters for that gate, the set of values being sampled from a distribution of that particular process parameter for that gate and includes a nominal value for that particular process parameter; calculating a total delay through a path for each RVS; and selecting at least two paths having highest total delays for each fault site under random variations of the RVSs. Delay test patterns can then be generated for the selected paths.

20 Claims, 11 Drawing Sheets

(56) References Cited

OTHER PUBLICATIONS

Rajeshwary Tayade et al. "Small-Delay Defect Detection in the Presence of Process Variations" Microelectron. J., Aug. 2008, 6 pages, vol. 39, No. 8.

Mahmut Yilmaz et al. "Test-Pattern Selection for Screening Small-Delay Defects in Very-Deep Submicrometer Integrated Circuits" IEEE Transactions on Computer-Aided Design of Integrated Circuits and Systems, May 2010, 14 pages, vol. 29. No. 5.

Rolf-P. Vollertsen "Burn-In" Proc. Integr. Rel. Workshop Final Rep., 1999, 7 pages.

Behnam Ghavami et al. "CNT-Count Failure Characteristics of Carbon Nanotube FETs Under Process Variations" 2011 IEEE International Symposium on Defect and Fault Tolerance in VLSI and Nanotechnology Systems, Oct. 2011, 7 pages.

Yu-Ming Lin et al. "High-Performance Dual-Gate Carbon Nanotube FETs with 40-nm Gate Length" IEEE Electron Device Letters, Nov. 2005, 3 pages, vol. 26, No. 11.

Chenguang Qiu et al. "Scaling Carbon Nanotube CMOS FETs towards Quantum Limit" IEDM Tech. Dig., Dec. 2017, 4 pages.

Chi-Shuen Lee et al. "A Compact Virtual-Source Model for Carbon Nanotube FETs in the Sub-10-nm Regime—Part I: Intrinsic Elements" IEEE Transactions on Electron Devices, Sep. 2015, 9 pages, vol. 62, No. 9.

Sanmitra Banerjee et al. "Analysis of the Impact of Process Variations and Manufacturing Defects on the Performance of Carbon-Nanotube FETs" IEEE Transactions on Very Large Scale Integration (VLSI) Systems, Jun. 2020, 14 pages, vol. 28, No. 6.

Chi-Shuen Lee et al. "Virtual-Source Carbon Nanotube Field-Effect Transistors Model" Dept. Elect. Eng., Stanford Univ.,Technical User's Manual Version 1.0.1, Retrieved on: Aug. 10, 2020, 34 pages.

P. Bernardi et al. "On the Modeling of Gate Delay Faults by means of Transition Delay Faults" 2011 IEEE International Symposium on Defect and Fault Tolerance in VLSI and Nanotechnology Systems, Oct. 2011, 7 pages.

Irith Pomeranz, "A Metric for Identifying Detectable Path Delay Faults" IEEE Transactions on Computer-Aided Design of Integrated Circuits and Systems, Nov. 2012, 9 pages, vol. 31, No. 11.

Irith Pomeranz et al. "Transition Path Delay Faults: A New Path Delay Fault Model for Small and Large Delay Defects" IEEE Transactions on Very Large Scale Integration (VLSI) Systems, Jan. 2008, 10 pages, vol. 16, No. 1.

Xiang Lu et al. "PARADE: PARAmetric Delay Evaluation Under Process Variation" Proc. ISSCS, Mar. 2004, 5 pages.

Behnam Ghavami et al. "Failure Characterization of Carbon Nanotube FETs Under Process Variations: Technology Scaling Issues" IEEE Transactions on Device and Materials Reliability, Jun. 2016, 8 pages, vol. 16, No. 2.

Bipul C. Paul et al. "Impact of Process Variation on Nanowire and Nanotube Device Performance" IEEE Transactions on Electron Devices, Sep. 2007, 8 pages, vol. 54, No. 9.

Vikas Mehrotra et al. "A Methodology for Modeling the Effects of Systematic Within-Die Interconnect and Device Variation on Circuit Performance" Proc. DAC, 2000, 4 pages.

Aseem Agarwal et al. "Statistical Timing Analysis for Intra-Die Process Variations with Spatial Correlations" Proc. ICCAD, Nov. 2003, 8 pages.

Xiang Lu et al. "Longest-Path Selection for Delay Test Under Process Variation" IEEE Transactions on Computer-Aided Design of Integrated Circuits and Systems, Dec. 2005, 6 pages, vol. 24, No. 12.

Ronn B. Brashear et al. "Predicting Circuit Performance Using Circuit-level Statistical Timing Analysis" Proceedings of European Design and Test Conference, 1994, 6 pages.

Nisar Ahmed et al. "Timing-Based Delay Test for Screening Small Delay Defects" DAC, Jul. 2006, 6 pages.

Ankush Srivastava et al. "A Methodology for Identifying High Timing Variability Paths in Complex Designs" IEEE 24th Asian Test Symposium, 2015, 6 pages.

Max M. Shulaker et al. "Efficient Metallic Carbon Nanotube Removal for Highly-Scaled Technologies" IEDM Tech. Digest, Dec. 2015, 4 pages.

Nishant Patil et al. "Scalable Carbon Nanotube Computational and Storage Circuits Immune to Metallic and Mispositioned Carbon Nanotubes" IEEE Transactions on Nanotechnology, Jul. 2011, 7 pages, vol. 10, No. 4.

Nishant Patil et al. "Digital VLSI Logic Technology using Carbon Nanotube FETs: Frequently Asked Questions" Proc. DAC, Jul. 2009, 6 pages.

Bharathan Balaji et al. "Accurate Characterization of the Variability in Power Consumption in Modern Mobile Processors" Proc. HotPower, 2012, 5 pages.

Puneet Gupta et al. "Underdesigned and Opportunistic Computing in Presence of Hardware Variability" IEE Transactions on Computer-Aided Design of Integrated Circuits and Systems, Jan. 2013, 16 pages, vol. 32, No. 1.

X. Liu et al. "Detailed analysis of the mean diameter and diameter distribution of single-wall carbon nanotubes from their optical response" Physical Review B, 2002, 9 pages, vol. 66, No. 4.

Ziyad Al Tarawneh "The Effects of Process Variations on Performance and Robustness of Bulk CMOS and SOI Implementations of C-Elements" Ph.D. dissertation, School Elect., Electron. Comput. Eng., Newcastle Univ., Newcastle upon Tyne, UK, Apr. 2011, 177 pages.

Jie Zhang et al. "Carbon Nanotube Circuits in the Presence of Carbon Nanotube Density Variations" Proc. DAC, 2009, 6 pages.

Bardia Bozorgzadeh et al. "Delay Variation Analysis in the Presence of Power Supply Noise in Nano-Scale Digital VLSI Circuits" Proc. IEEE 57th Int. Midwest Symp. Circuits Syst. (MWSCAS), Aug. 2014, 4 pages.

Yasuo Sato et al. "Invisible Delay Quality—SDQM Model Lights Up What Could Not Be Seen" Proc. ITC, Nov. 2005, 9 pages.

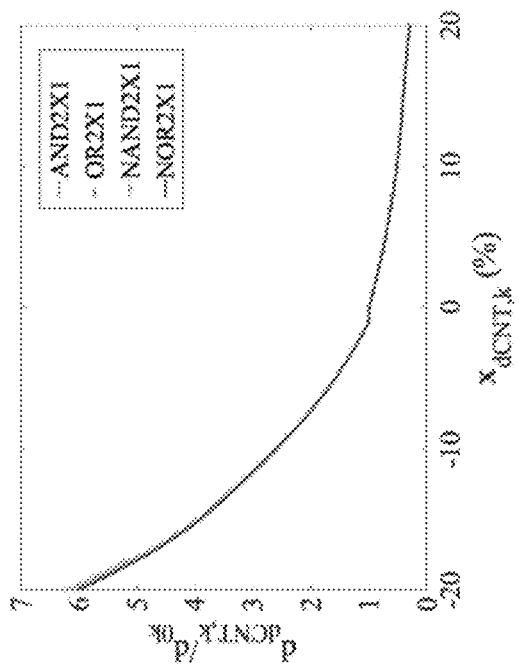
Figure 5A
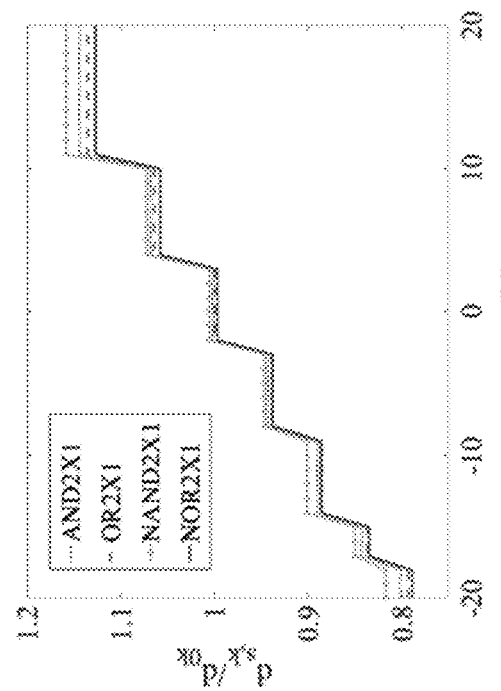
Figure 5B
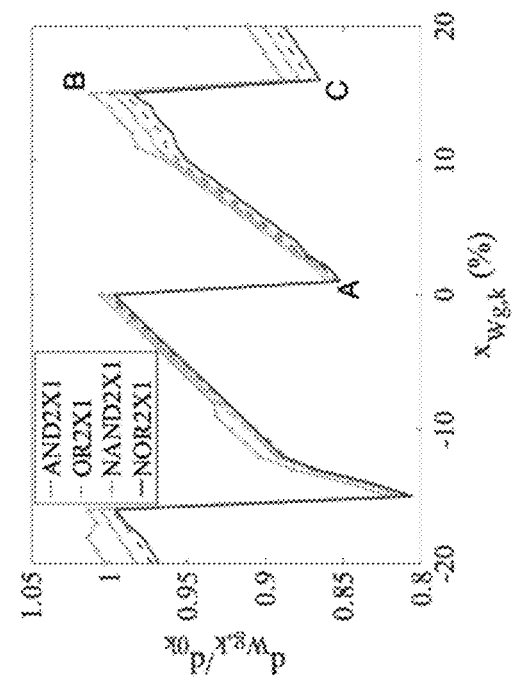
Figure 5D
Figure 5C

VARIATION-AWARE DELAY FAULT TESTING

GOVERNMENT SUPPORT

This invention was made with Government support under Federal Grant no. HR001118C0096 awarded by the Defense Advanced Research Projects Agency (DARPA). The Federal Government has certain rights to this invention.

BACKGROUND

Sensitivity to process variations and manufacturing defects are major showstoppers for the design and high-volume manufacturing of integrated circuits (ICs) based on devices such as carbon nanotube FETs (CNFETs). These imperfections affect gate delay and may remain undetected when test patterns obtained using conventional test-generation techniques are used. Thus, there is an ongoing need for improved detection of imperfections.

It has been shown that the impact of CNFET parameter variations on the gate delay is non-linear for several parameters. This limits the applicability of previously proposed silicon-based methods. Similar to CNFETs, other emerging device technologies can exhibit similar non-linearities in the impact of parameter variations.

BRIEF SUMMARY

Variation-aware delay fault testing is provided. A statistical metric involving random simultaneous parameter variations is used to grade test pattern sets, enabling improved testability of process variation-induced faults that are typically introduced during manufacturing. The described techniques can be integrated with electronic design automation (EDA) tools, including automated test pattern generation tools, for an improved delay fault testing flow and test pattern generation.

An EDA tool can include instructions for path selection through a potential fault site in an integrated circuit that direct a computing system to perform long path selection by generating random variation scenarios, wherein a random variation scenario (RVS) is an instance of an input netlist where values for a set of process parameters for each gate are chosen from a set of values for each process parameter of the set of process parameters for that gate, the set of values being sampled from a distribution of that particular process parameter for that gate and includes a nominal value for that particular process parameter, wherein across different RVSs, the values for the set of process parameters are independently chosen for each gate in a path; calculating a total delay through a path for each RVS; and selecting a number of paths having highest total delays for each fault site under random variations of the RVSs, wherein the number of paths is at least two paths having the highest total delays. Delay test patterns can then be generated for the selected paths.

The value of the propagation delay for the set of process parameters for each gate can be obtained from a standard cell delay library. In some cases, the EDA tool can further include instructions for standard cell delay library generation that direct a computing system to receive a netlist of a standard cell for the EDA tool; create a mapping data structure for the standard cell that stores a set of variations of a nominal parameter value across a range of variation for a set of parameters associated with a device or devices forming the standard cell; perform a set of simulations of propagation delay for the standard cell, each simulation of the set of simulations being a group of simulations for a corresponding independently varied parameter of the set of parameters; calculate a mean value of an increase in propagation delay from the group of simulations for each parameter and corresponding variation from the nominal parameter value; and store the mean value of the increase in the propagation delay for each parameter and corresponding variation from the nominal parameter value in the mapping data structure. The mean value of the increase in propagation delay due to each parameter variation can used to calculate the total delay through the path for each RVS.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5A illustrates a schematic of a top-gated CNFET and corresponding device parameters.

FIGS. 5B-5D illustrate delay of various logic gates with variations in CNFET parameters of carbon nanotube diameter (dCNT) (FIG. 5B), gate width (Wg) (FIG. 5C), and inter-carbon nanotube spacing (s) (FIG. 5D).

DETAILED DESCRIPTION

Variation-aware delay fault testing is provided. A statistical metric involving random simultaneous parameter variations is used to grade test pattern sets, enabling improved testability of process variation-induced faults that are typically introduced during manufacturing. The described techniques can be integrated with electronic design automation (EDA) tools, including automated test pattern generation tools, for an improved delay fault testing flow and test pattern generation.

Figure 1:
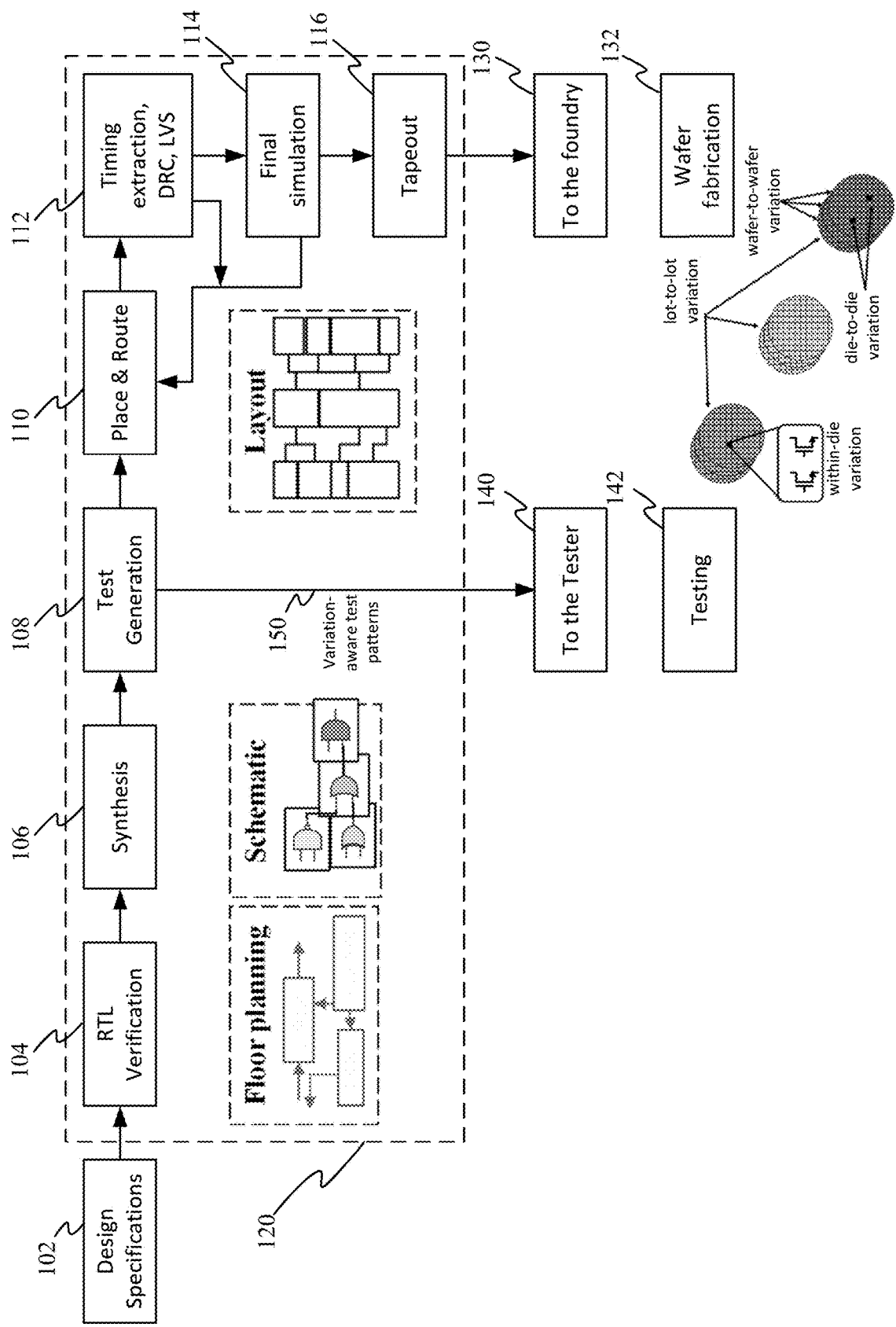
FIG. 1 illustrates an integrated circuit design flow that can incorporate variation-aware delay fault testing.

FIG. 1 illustrates an integrated circuit design flow that can incorporate variation-aware delay fault testing. The design process for electronic circuits includes a step for placement of circuit elements and routing of wires and interconnections. This can be carried out at the chip level—for integrated circuits or a field programmable gate array—or at a circuit board level—for printed circuit boards or other circuit packages. Electronic design automation (EDA) tools, such as available through Cadence Design Systems, Inc. and Synopsys, Inc., are used during the place and route stage to optimize arrangements and enable increased complexity in design (as compared to manual layout).

Referring to FIG. 1, the physical design stage of an integrated circuit design process generally includes verification 102 (e.g., Register Transfer Level (RTL) verification simulates and verifies that a functional design from design specifications 104 is logically correct and meets certain timing constraints), logic synthesis 106 (e.g., conversion of a functional, RTL design to logic gates such as in the form of a netlist), design for test insertion/test generation 108, place and route 110 (which may include aspects including floor planning, power planning, placement, clock tree synthesis, and routing), verification 112 (e.g., timing extraction, design rule checking, and layout versus schematic (LVS) checking), final simulation 114 (which along with the verification 112 processes can be fed back for iterative place and route 110 processes),and "tapeout" 116 (export of data in form for manufacturing). These stages may be carried out using associated tools that may individually or together form an EDA tool (separately or collectively 120). For example, in one EDA tool with automatic place and route (APR) software, a gate-level netlist, which may be obtained from a logic synthesis tool (as part of the logic synthesis stage), is physically implemented in a layout by placing standard-cell layout (placement stage) and then auto-routing cells (routing stage) based on the connections inferred from the netlist. Where the APR software is separate from that used in the subsequent stages, the routed design can be exported from the APR tool in a format that can be understood by post analysis tools such as extraction or power analysis tools. The described techniques may be incorporated into an existing EDA tool or be a stand-alone or plug-in tool. Indeed, the described processes can be provided as part of one or more software modules of an EDA tool that when executed by a computing device direct the computing device to perform these processes.

The data from tapeout 116 is provided to a foundry 130 for wafer fabrication 132. There are a number of potential sources of defects during manufacturing, which may result in imperfections that, while not easily visible, do adversely affect operation of the integrated circuits. As part of the manufacturing process (of wafer fabrication 132), optical proximity correction, manufacturing rules checking, mask generation, design rule application, and wafer fabrication may be carried out. Assembly and packaging are then performed before shipping out a finished product. Mask generation (and application) can result in pattern variations between the design phase and the manufacturing phase. Defects can also occur during wafer fabrication, including line breaks, bridges, introduction of foreign material, as well as surface flatness variations. Further defects may occur during assembly and packaging, where package tests are applied to identify the packages to ship and the shipped integrated circuits are also often subject to in-field testing. Imprecise manufacturing processes can result in on-chip variations, including variations that arise due to change in ambient conditions such as temperature, pressure, humidity, and material impurities. Indeed, there can be lot-to-lot variation, wafer-to-wafer variation, die-to-die variation, and within-die variation. The two main types of imperfections are due to process variations (random changes in circuit parameters) and manufacturing defects causing opens, shorts, and voids.

To detect imperfections from process variation and other defects, test patterns generated during test generation 108 are provided to a tester 140 for testing operations 142. As part of the described variation-aware delay fault testing, variation-aware test patterns 150 can be provided to the tester. The variation-aware test patterns 150 are generated during test generation using, for example, a module configured such as shown in FIG. 2.

Figure 2:
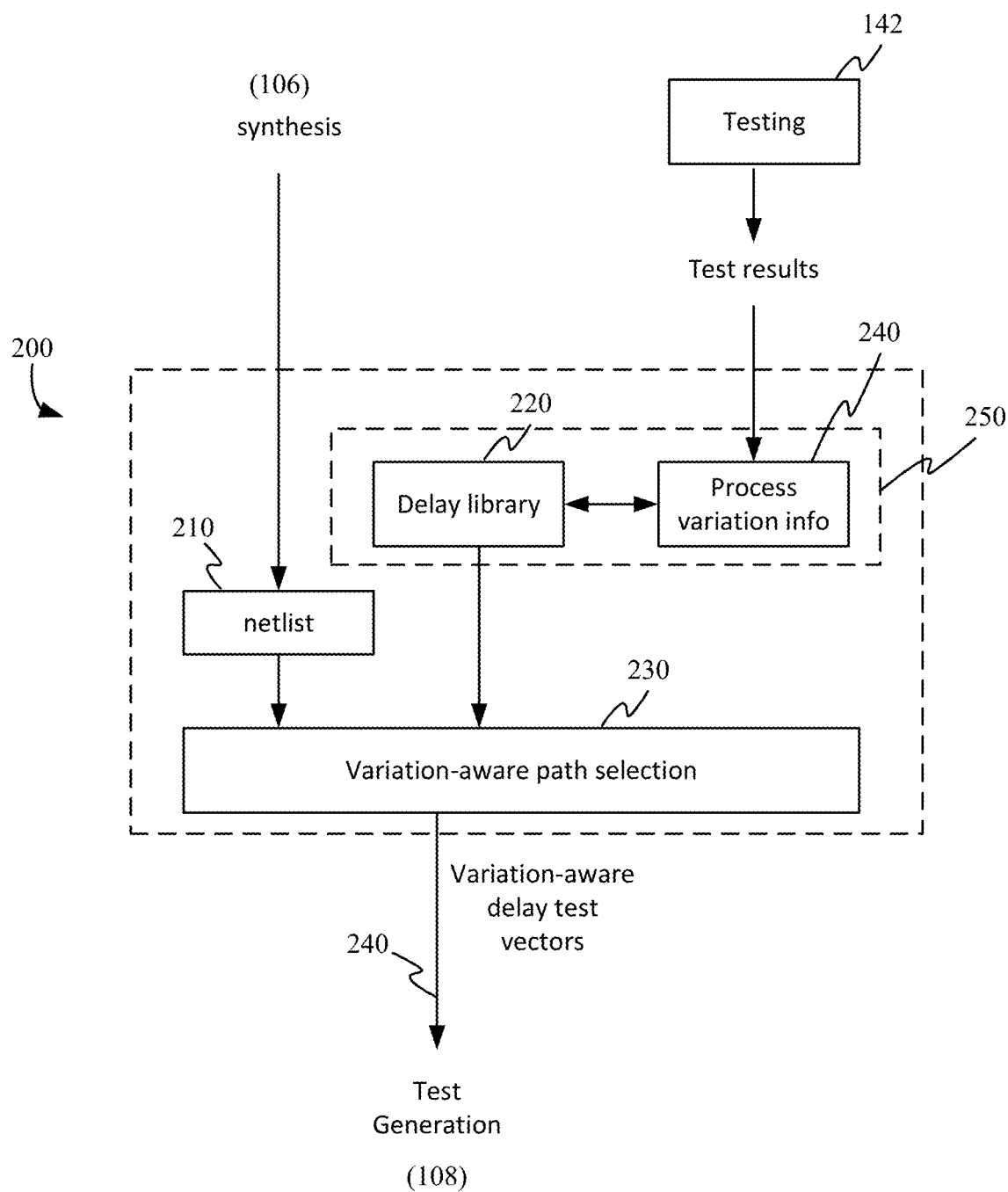
FIG. 2 illustrates an example configuration of a variation-aware path selection module for use to generate variation-aware test patterns.

FIG. 2 illustrates an example configuration of a variation-aware path selection module for use to generate variation-aware test patterns. Referring to FIG. 2, a variation-aware path selection module 200 can be part of the physical design stage of an integrated circuit design process between synthesis 106 and test generation 108 as described with respect to FIG. 1. Module 200 can be part of an EDA tool (e.g., integrated with an existing EDA tool, a stand-alone EDA tool, or a plug-in for an EDA tool) and uses an input netlist 210 and delay library 220 for variation-aware path selection operations 230 (e.g., by predicting path delay under random variations as described with respect to FIG. 3A). A netlist describes the connectivity of a circuit and may be in a format such as Verilog, VHDL, Spice, or other languages that can be synthesized and used by placement and routing tools (before manufacturing preparation).

Figure 3A:
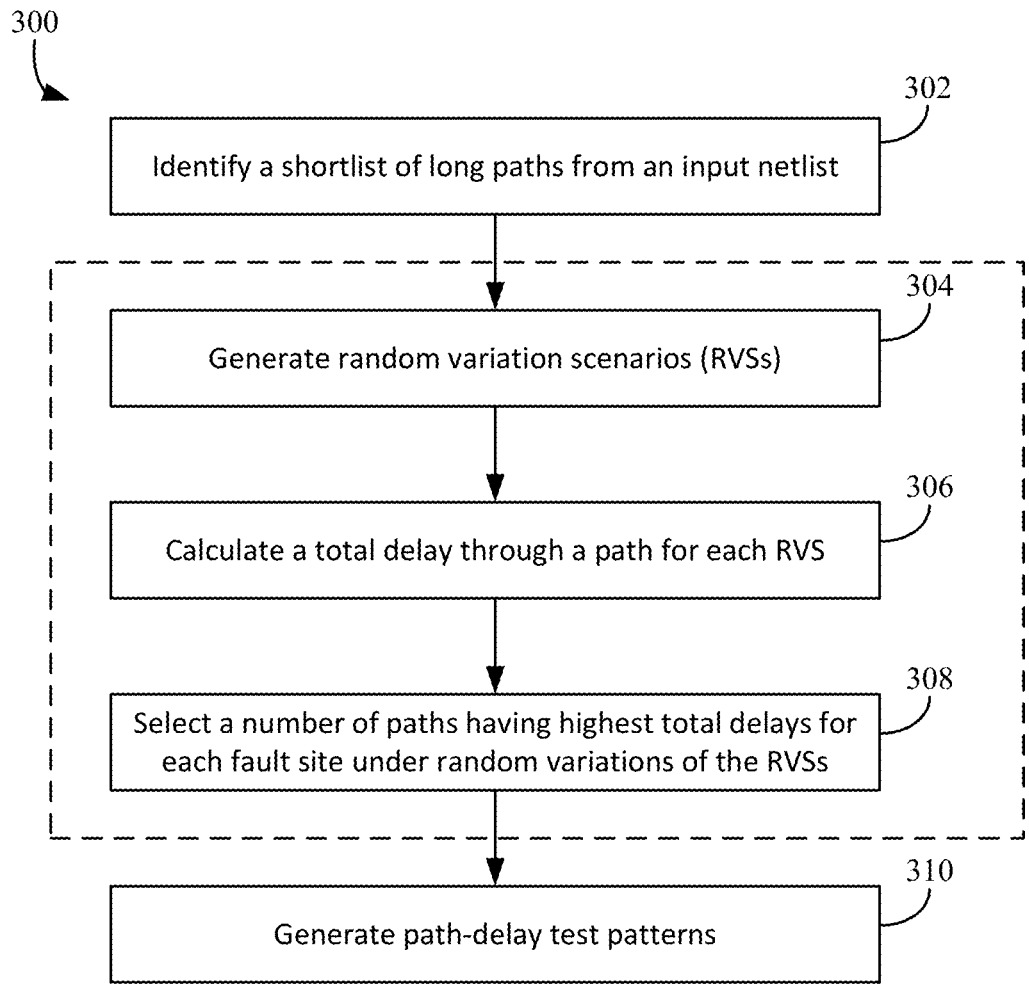
FIG. 3A shows an example process flow for long path selection.
Figure 3B:
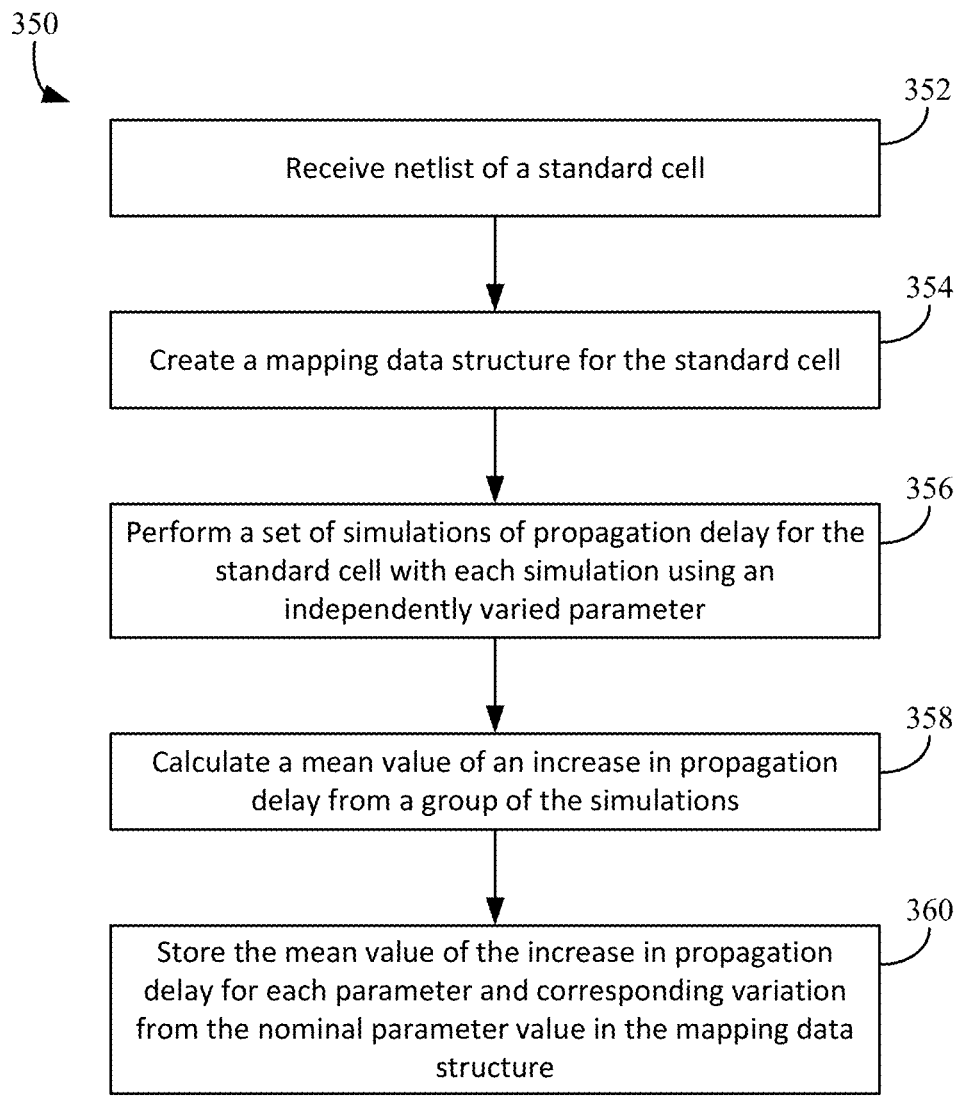
FIG. 3B shows an example process flow for delay library generation.

Module 200 can also receive process variation information 240, including from test results of testing operations 142, to generate the delay library 220 (e.g., for delay library generation operations 250 such as described with respect to FIG. 3B). The delay library can be formed of mapping data structures for standard cells of an EDA tool. The mapping data structures can provide, for a set of process parameters of a particular gate (or other element of a standard cell), a mean value of an increase in propagation delay from a group of simulations for each parameter and corresponding variation from the nominal parameter value. In some cases, the mapping data structure can be in the form of a look up table.

FIG. 3A shows an example process flow for long path selection; and FIG. 3B shows an example process flow for delay library generation.

Referring to FIG. 3A, a process flow for long path selection 300 can include an optional initial step of identifying (302) a shortlist of long paths from an input netlist. The shortlist of long paths includes paths through each potential fault site having a nominal slack in an absence of process variations that is less than a threshold and being a real path testable by a test pattern (i.e., that the path is not a false path). Primarily, the process flow for long path selection 300 includes generating (306) random variation scenarios (RVSs), wherein an RVS is an instance of the input netlist where values for a set of process parameters for each gate are chosen from a set of values for each process parameter of the set of process parameters for that gate, the set of values being sampled from a distribution of that particular process parameter for that gate and includes a nominal value for that particular process parameter, wherein across different RVSs, the values for the set of process parameters are independently chosen for each gate in a path; calculating (306) a total delay through a path for each RVS; and selecting (308) a number of paths having highest total delays for each fault site under random variations of the RVSs, wherein the number of paths is at least two paths having the highest total delays. For the selected paths, path-delay test patterns can then be generated (310).

In some cases, process 300 can further include receiving input of a maximum number of paths to be considered through each potential fault site, the maximum number of paths being the number of paths, when available, for selection during the selecting the number of paths having the highest total delays for each fault site; and receiving input of a total number of RVS to simulate for each path.

In some cases, process 300 can include accessing a mapping data structure for process variation specifications of each standard cell from which the values for the set of process parameters are randomly chosen for each RVS, each mapping data structure indicating the nominal value and the distribution for each particular process parameter of the set of process parameters for each gate. The values for the set of process parameters for each gate, when generating the RVSs in operation 306) can be obtained from a standard cell delay library generated as described with respect to FIG. 3B.

Referring to FIG. 3B, a delay library generation process 350 can include receiving (352) a netlist of a standard cell; creating (354) a mapping data structure for the standard cell that stores a set of variations of a nominal parameter value across a range of variation for a set of parameters associated with a device or devices forming the standard cell; performing (356) a set of simulations of propagation delay for the standard cell, each simulation of the set of simulations being a group of simulations for a corresponding independently varied parameter of the set of parameters; calculating (358) a mean value of an increase in propagation delay from the group of simulations for each parameter and corresponding variation from the nominal parameter value; and storing (360) the mean value of the increase in the propagation delay for each parameter and corresponding variation from the nominal parameter value in the mapping data structure. The process can be repeated for each standard cell of at least those used in a particular circuit design. The mean value of the increase in propagation delay due to each parameter variation can used to calculate the total delay through the path for each RVS in operation 308 of FIG. 3A.

The particular parameters selected for the set of parameters used in the mapping data structure can be based on their contributions to affecting delay through the device. For example, as discussed in more detail in the experiments, the carbon nanotube diameter, gate length, dielectric thickness, gate width, and inter-carbon nanotube spacing of carbon nanotube field effect transistors (CNFETs) have been shown to have a significant effect on the propagation delay of the device. Accordingly, at least one of these parameters can be used as part of the set of parameters for the mapping data structure of standard cells incorporating CNFETs. It should be noted that the described methods are applicable to CNFETs irrespective of their geometry (e.g., top-gated CNFETs and bottom-gated CNFETs), as well as for other technologies and devices.

Figure 4A:
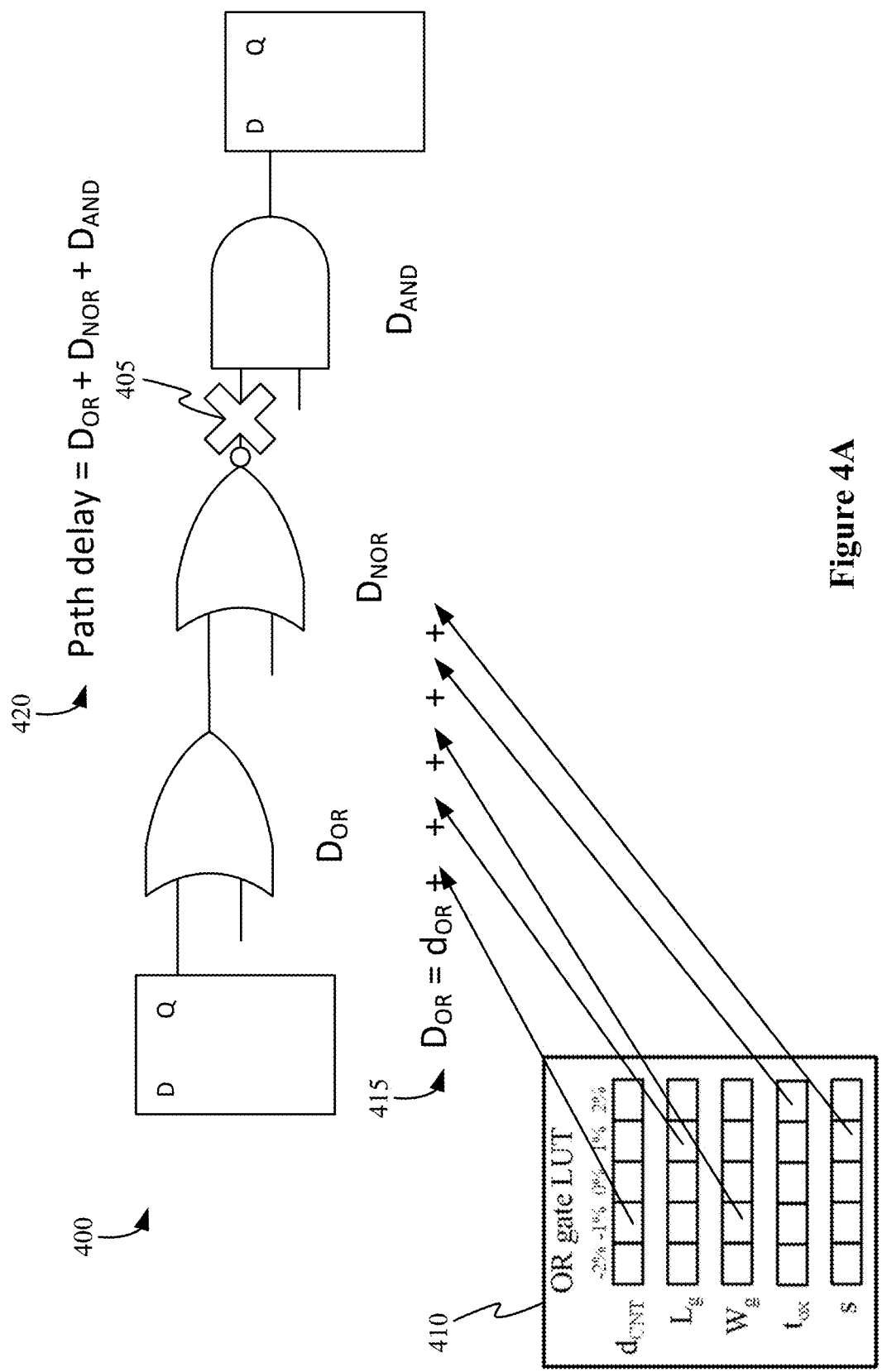
FIGS. 4A and 4B illustrate an example flow for variation-aware delay fault testing for a simple CNFET circuit.
Figure 4B:
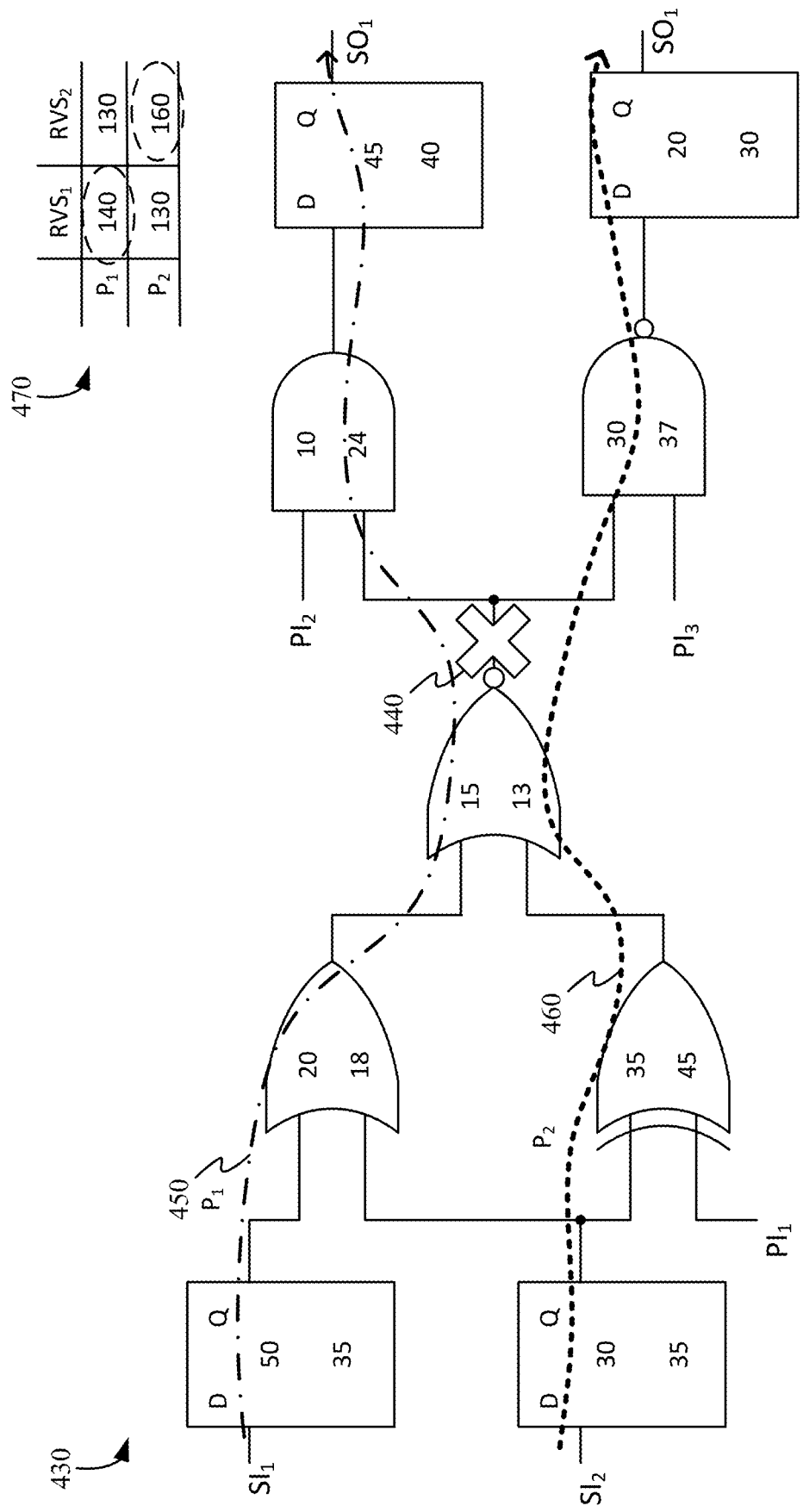

FIGS. 4A and 4B illustrate an example flow for variation-aware delay fault testing for a simple CNFET circuit. FIGS. 4A and 4B provide an example of generating a random variation scenario and long path selection. Referring to FIG. 4A, a random variation scenario for a path 400 through a fault site 405 can be generated by using selected process parameters for each gate. Here, the path 400 in the simple gate-level design includes an OR gate, NOR gate, and AND gate between two flops. Thus, for each gate, the associated mapping data structure from the delay library is accessed and values for a set of process parameters for that gate is chosen. In this example, the mapping data structure 410 (e.g., look up table) for the OR gate is shown. The delay 415 through the OR gate for the random variation scenario is calculated using values which can be randomly selected from the mapping data structure 410. Also included in the example delay equation 415 is d_OR, which refers to the nominal gate delay (in the absence of any parameter variation).

Once each gate delay is calculated using the values randomly selected from the mapping data structure for that gate, a total delay 420 through the path 400 can be calculated by adding the delay of each gate.

As briefly mentioned above, variations in the device process parameters affect the propagation delay of logic gates in a netlist, and these faults can be detected using a test set that propagates transitions through the fault sites. In the conventional approach, the minimum-slack testable path through a fault site is used for pattern generation. However, under process variations such as seen with carbon nanotube transistors, the delay through each path changes, and thus, another path through the fault site may have lesser slack than the original selected long path (see e.g., FIGS. 7A and 7B). Accordingly, through the described technique a number of paths are selected that have the highest total delays for each fault site under random variations of the RVSs. For example, referring to FIG. 4B, with simple gate-level design 430, two paths are shown through fault site 440: a first path P1 450 similar to path 400 of FIG. 4A; and a second path P2 460. In this example, the total number of RVS that will be simulated is two. The representative delay values for the two different RVSs are shown in each gate. They may be calculated as described with respect to FIG. 4A. As shown in the table 470, for the first RVS ($RVS_1$), the first path P1 450 has a delay of 140 and the second path P2 460 has a delay of 130. For the second RVS (RVS2), the first path P1 450 has a delay of 130 and the second path P2 460 has a delay of 160. Assuming that the number of paths to be considered through each gate (node) is at least two, then both the first path P1 450 and the second path P2 460 could be selected for generating test patterns, providing a higher likelihood that a small delay defect will be propagated through the actual longest path even in the presence of process variations.

Variations in the CNFET process parameters affect IoN, which, in turn, affects the propagation delay of logic gates. These variations are typically manifested in the form of small delay defects (SDDs). In the proposed delay-fault testing method, these process variation scenarios are taken into account while generating the test patterns.

FIG. 5A illustrates a schematic of a top-gated CNFET and corresponding device parameters; and FIGS. 5B-5D illustrate delay of various logic gates with variations in CNFET parameters of carbon nanotube diameter (dCNT) (FIG. 5B), gate width (Wg) (FIG. 5C), and inter-carbon nanotube spacing (s) (FIG. 5D).

FIGS. 5B-5C show how the normalized delay dik/dok varies with variations in the other CNFET parameters, namely dCNT, s, and $W_g$, for the AND2×1, OR2×1, NAND2×1, and NOR2×1 standard cells. For each gate, single-parameter variations are introduced in all the CNFETs using the Verilog-A file accompanying the VSCNFET compact model. Using HSPICE simulations, the propagation delay of the gate Gk in the presence of variations in parameter $p_i$, given by $d_{ik}$, is calculated. Similar to Si-MOSFETs, the gate delay increases linearly with an increase in $t_{ox}$ and $L_g$. Note that dok is the nominal gate delay, and the percentage deviation of a parameter ($x_{ik}$) is calculated from its nominal value. All simulations were performed at the 7-nm technology node, and the corresponding nominal values listed in Table I were used.

TABLE I

| | Nominal values | | | | |
|---|---|---|---|---|---|
| Parameter | 7 nm | 11 nm | 14 nm | 22 nm | 45 nm |
| CNT diameter ($d_{CNT}$) [nm] | 1.2 | 1.2 | 1.2 | 1.2 | 1.2 |
| Gate length ($L_g$) [nm] | 11 | 14 | 19 | 26.5 | 40 |
| Oxide thickness ($t_{ox}$) [nm] | 0.7 | 0.8 | 0.9 | 1 | 1.25 |
| Gate width ($W_g$) [nm] | 63 | 90 | 112 | 160 | 240 |
| Inter-CNT spacing (s) [nm] | 4 | 4 | 4 | 4 | 4 |
| Gate height ($H_g$) [nm] | 15 | 20 | 20 | 30 | 40 |

The variation in $d_{CNT}$ has a catastrophic impact on $I_{ON}$; this is also reflected in the propagation delay of standard cells. As $d_{CNT}$ decreases, $I_{ON}$ decreases, and the propagation delay increases. From FIG. 5B, it can be seen that even a 5% decrease in dcNT results in a 50% increase in the gate delay. Similarly, with an increase in gate length and oxide thickness, $I_{ON}$ decreases, and gate delay increases linearly.

From FIG. 5C, it can also be seen that, as $W_g$ changes, the propagation delay varies in a ramp-like fashion. $I_{ON}$ is proportional to $N_{CNT}=\lceil W_g/s \rceil$; therefore, $I_{ON}=\lambda_1 \lceil W_g/s \rceil$, where $\lambda_1$ is proportionality constant. Similar to Si-MOSFETs, the gate capacitance of the load $C_g$ is $\lambda_2 W_g$, where $\lambda_2$ is another constant of proportionality. The gate delay is the time required to charge the load capacitance; in the presence of variations in $W_g$, this is given by $$d_{W_g,k} = \frac{C_g V_{DD}}{I_{ON}} = \frac{\lambda_2 W_g \cdot V_{DD}}{[\lambda_1/s]} = K \cdot \frac{W_g}{\lceil W_g/s \rceil}$$

where VDD is the supply voltage and K is a constant independent of $W_g$. As can be seen, when $W_g$ increases from point A to point B, $\lceil W_g/s \rceil$ remains constant. Due to this, $d_{w^g,k}$ increases linearly with $W_g$. However, when $W_g$ increases from point B to point C, $\lceil W_g/s \rceil$ increases, resulting in a steep drop in $D_{gate}$. However, note that, while the propagation delay at the ramp peaks remains constant, the width of each ramp and the delay at the ramp trough decrease as $W_g$ increases. Due to this, the delay dependence cannot be modeled accurately by an ideal ramp function. With an increase in the CNT spacing, s, $N_{CNT}$ decreases in steps, and as a result, the gate delay increases in steps, as shown in FIG. 5D. The gate height $H_g$ has a negligible impact on the propagation delay.

Figure 6:
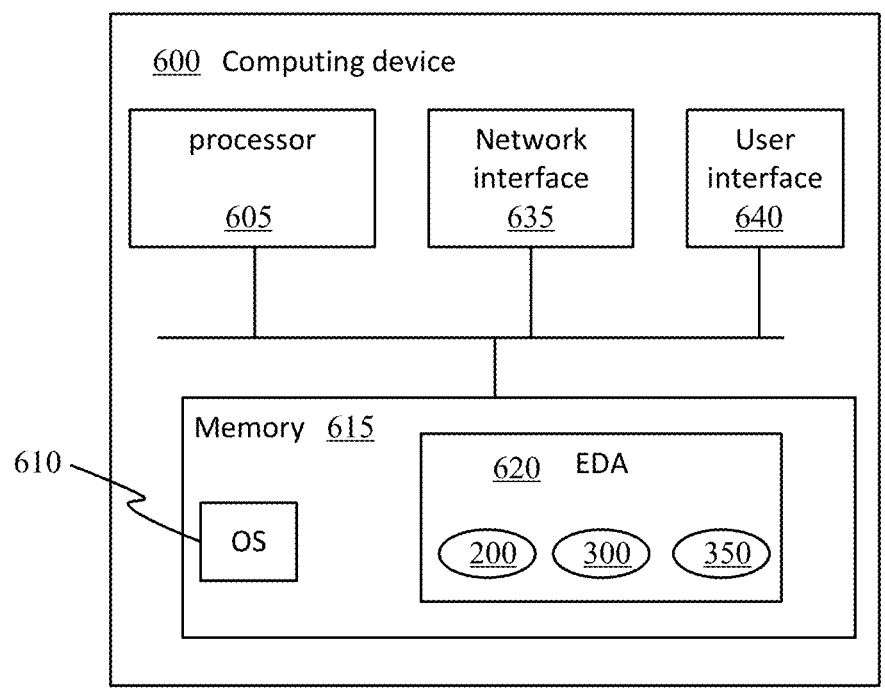
FIG. 6 is a block diagram illustrating components of a computing device used for EDA with observation point insertion or testing.

FIG. 6 is a block diagram illustrating components of a computing device used for EDA with variation-aware delay fault testing. For example, a computing device embodied as system 600 can be used in implementing a computing device executing an EDA software tool incorporating the described variation-aware delay fault testing, including the processes described with respect to FIGS. 2, 3A, 3B, 4A, and 4B. It should be understood that aspects of the system described herein are applicable to both mobile and traditional desktop computers, as well as server computers and other computer systems. Accordingly, certain aspects described with respect to system 600 are applicable to server(s) on which a software tool may be carried out in the case of networked computing stations or web-based tools.

For example, system 600 includes a processor 605 (e.g., CPU, GPU, FPGA) that processes data according to instructions of one or more application programs (which can include the modules described herein for the EDA tools), and/or operating system (OS) 610 stored in memory 615.

Memory 615 can be any suitable computer-readable storage medium including, but not limited to, volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the memory 615 consist of transitory propagating signals.

Memory 615 can store application programs such as programs for automated testing 620 that include variation-aware delay fault testing such as instructions and data structures for module 200 described with respect to FIG. 2 and instructions for processes 300 and 350 described with respect to FIGS. 3A and 3B, as well as the processes described with respect to the experiments below as examples.

System 600 may also include a radio/network interface 635 that performs the function of transmitting and receiving radio frequency communications. The radio/network interface 635 facilitates wireless connectivity between system 600 and the "outside world," via a communications carrier or service provider. The radio/network interface 635 allows system 600 to communicate with other computing devices, including server computing devices and other client devices, over a network.

In various implementations, data/information, including a delay library, used by and/or stored via the system 600 may include data caches stored locally on the device or the data may be stored on any number of storage media that may be accessed by the device via the radio/network interface 635 or via a wired connection between the device and a separate computing device associated with the device, for example, a server computer in a distributed computing network, such as the Internet. As should be appreciated such data/information may be accessed through the device via the radio interface 635 or a distributed computing network. Similarly, such data/information may be readily transferred between computing devices for storage and use according to well-known data/information transfer and storage means, including electronic mail and collaborative data/information sharing systems.

System 600 can also include user interface system 640, which may include input and output devices and/or interfaces such as for audio, video, touch, mouse, and keyboard. Visual output can be provided via a display that may present graphical user interface ("GUI") elements, text, images, video, notifications, virtual buttons, virtual keyboards, messaging data, circuit layout, and any other information that is capable of being presented in a visual form.

The methods and processes described herein can be embodied as code and/or data. The software code and data described herein can be stored, for example as modules, on one or more computer readable media, which may include any device or medium that can store code and/or data for use by a computer system. As used herein, computer readable storage media/medium should not be construed to consist of transitory propagating signals.

Accordingly, embodiments of the subject invention may be implemented as a computer process, a computing system, or as an article of manufacture, such as a computer program product or computer-readable storage medium. Certain embodiments of the invention contemplate the use of a machine in the form of a computer system within which a set of instructions, when executed, can cause the system to perform any one or more of the methodologies discussed above, including providing a software tool or a set of software tools that can be used during the physical design of integrated circuits and/or printed circuit boards and/or system level design and associated test pattern generation. The set of instructions for the software tool can be stored on a computer program product, which may be one or more computer readable storage media readable by a computer system and encoding a computer program including the set of instructions and other data associated with the software tool.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

Experiments

The statistical delay quality level (SDQL) is a commonly used surrogate metric for SDD coverage and test pattern grading; a lower value of SDQL signifies higher effectiveness of the SDD test patterns. Pattern sets obtained using the proposed method are compared with those generated by a related technique from academia, as well as a state-of-the-art commercial ATPG tool. Simulation results for multiple benchmarks show that the test generated using the proposed method consistently offers the lowest SDQL value.

Figure 7A:
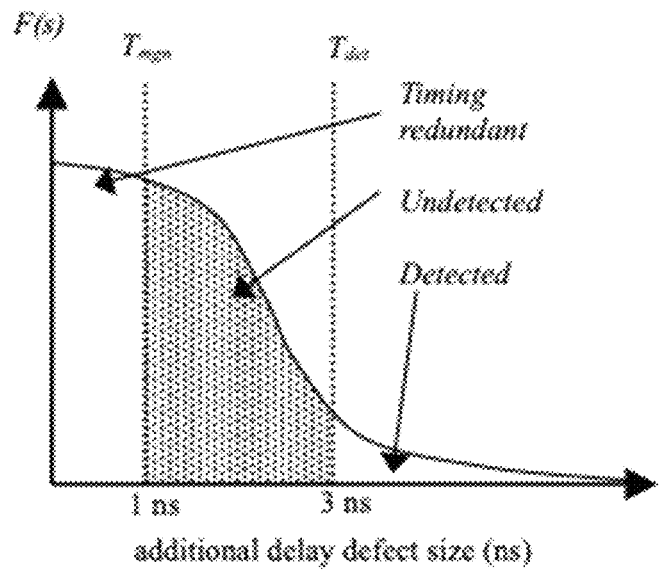
FIG. 7A illustrates an example delay-defect distribution.
Figure 7B:
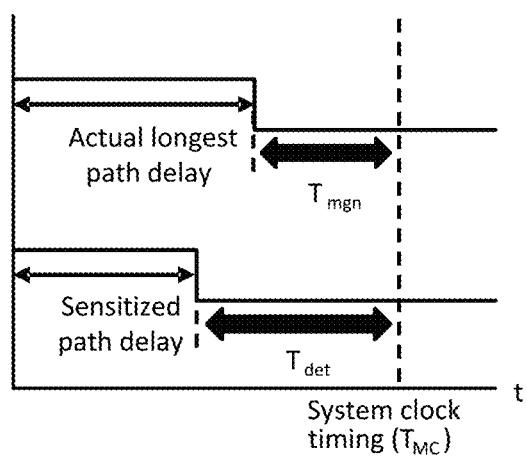
FIG. 7B compares a sensitized path delay is to an actual longest path delay.

Effective SDD detection requires the sensitization of faults through paths with minimal timing slack. Referring to FIGS. 7A and 7B, SDQL is a computationally tractable metric that takes the timing margin on the sensitized path into account. FIG. 7A illustrates an example delay-defect distribution; and FIG. 7B compares a sensitized path delay is to an actual longest path delay. Referring to FIG. 7A, the $T_{det}$ is the slack in a tested path and $T_{mgn}$ is the slack in the actual longest path. The area under the curve indicates the statistical delay quality level. This relationship is seen in FIG. 7B, where there is a larger slack than at the actual longest path delay, illustrating that as the timing slack on a sensitized path increases, the test pattern effectiveness goes down.

To simulate the effectiveness of test patterns under process variations, a delay-defect distribution function F(s) is considered, where s is the delay fault size in nanoseconds. Therefore, F(s) denotes the probability that a transition delay fault of size s exists at a random node. Note that F(s) is typically obtained from empirical data or a process test chip. SDD detection becomes more relevant when more defects are of small size, i.e., F(s) decreases rapidly with increasing s.

Consider an SDD fault X and a corresponding test pattern $TP_X$ for it. Let the timing margin of the longest (minimum-slack) path through X in the absence of any parameter variations be given by $T^*_m$. Similarly, let the nominal slack through the path sensitized by $TP_X$ be $T^*_d$. Therefore, faults of size s $<T^*_m$; are redundant, whereas all faults of size s$>T^*_d$; can be detected. The probability that an irredundant fault at X remains undetected is, therefore, given by $\int_{T^*_m}^{T^*_d} F(s)ds$.

The nominal SDQL for a test pattern set is then given by $$\theta^* = \sum_{j=1}^{2N} P^*_{X_j} = \sum_{j=1}^{2N} \int_{T^*_m}^{T^*_d} F(s)ds$$

where the number of nodes (delay faults) in the netlist is N(2N). The probability of SDD escape decreases with decreasing θ*. Conventional SDD ATPG tools attempt to generate a test-pattern set that minimizes θ*.

As previously mentioned, CNFET parameter variations have a significant impact on the gate delay, which affects the timing slacks on the longest and sensitized paths, as well as the SDQL.

Let the SDQL under a random parameter variation scenario be given by $\tilde{\theta}$. It can be found that $\mu(\tilde{\theta}) \geq \theta^*$, or in other words, it is likely that the SDQL value increases under parameter variations. The practical significance of this result is that a test set generated without considering CNFET process variations will lead to higher SDQL (lower test quality) than a variation-aware test. Let $D_k$ be a random variable that denotes the propagation delay of $G_k$ under a process variation scenario.

The conventional definition of SDQL, as given by the above relation, underestimates (overestimates) the SDQL (effectiveness) of the SDD test patterns under CNFET process variations. For different variations, the SDQL values are distributed over a range, and therefore, the mean SDQL, $\mu(\tilde{\theta})$, is used as a more accurate measure of test effectiveness when comparing the three test generation methods in the examples below.

Using the SDQL metric, the effectiveness of the test patterns generated by VADF for CNFET circuits are compared with the pattern set from a commercial ATPG tool and a related technique from academia, as described in the paper "Longest-path selection for delay test under process variation," by X. Lu et al., IEEE Trans. Comput.-Aided Design Integr. Circuits Syst., vol. 24, no. 12, pp. 1924-1929, Dec. 2005 ("Academia Technique"). In the commercial ATPG tool, test patterns are obtained using a "constrained" transition delay fault model. For effective SDD testing, the tool ensures the sensitization of long paths by allowing the user to set the maximum timing margin on any sensitized path (max_tmgn). Setting max_tmgn to a sufficiently low value increases test effectiveness; however, this results in increased ATPG effort and test pattern count. Delay defects of size greater than 20% of the rated clock period can be detected more easily using conventional transition delay patterns. Therefore, max_tmgn=$0.2 \cdot t_{clk}$, where $t_{clk}$ is the rated clock period.

The Academia Technique is targeted toward Si CMOS circuits, where variations are considered in metal width, metal thickness, ILD thickness, and gate length of Si-MOSFETs. These variations have a linear impact on the propagation delay, and thus, the path delay can be expressed as a linear function in the parameter variations. The authors utilize this linearity to map the longest path selection problem to the feasibility problem in linear programming. The set of long paths is then generated in O(n) time, where n is the number of testable paths through a fault site.

To apply the Academia Technique to CNFET circuits, the gate delay is first expressed as a linear function of the parameter variations. R-squared ($R^2$) is a well-known statistical metric used in linear regression; This statistical metric is used to compute the goodness-of-fit between the actual gate delays and the gate delays predicted by the linear model. Note that the $R^2$ metric is different from (rms Error)k defined earlier. The $R^2$ values when variations are introduced in different CNFET parameters for various gates are shown in Table II.

TABLE II

Goodness-of-fit-of the linear model for various CNFET parameters.

| Gate | $R^2_{d_{CNT}}$ | $R^2_s$ | $R^2_{W_g}$ | $R^2_{L_g}$ | $R^2_{t_{ox}}$ |
|---|---|---|---|---|---|
| AND2X1 | 0.8126 | 0.9696 | 0.0066 | 0.9877 | 0.9996 |
| OR2X1 | 0.8143 | 0.9684 | 0.0063 | 0.9966 | 0.9868 |
| NAHD2X1 | 0.8090 | 0.9696 | 0.0093 | 0.9791 | 0.9764 |
| NOR2 | 0.8158 | 0.9651 | 0.0143 | 0.9664 | 0.9723 |

Variations in $L_g$ and $t_{ox}$ have a linear impact on the delay; this is reflected by the high value of $R_{L_g}^2$ and $R_{t_{ox}}^2$. Variation in CNT spacings has a step impact that can nevertheless be satisfactorily modeled by a linear function. However, the low values of $R_{d_{CNT}}^2$ and $R_{W_g}^2$ highlight the limitation of the linear regression model. Using the linear model, path delays are predicted under different process variation scenarios, and at most $\rho_{max}$ long paths through each node are identified. Finally, test patterns are generated for path delay faults in the shortlisted paths. Significant inaccuracies are introduced when CNFET variations are modeled using a linear model; this, in turn, degrades the effectiveness of the test patterns.

Accordingly, advantageously, the variation-aware method described herein can use a CNFET delay library to model the path delay under CNFET variations. As previously described, the delay library can be a collection of gate-wise look up table on how each parameter affects the propagation delay. For the experiments, the delay library is obtained using HSPICE simulation of each gate and, thus, minimizes the modeling error. The test patterns are generated for delay faults on the final shortlisted paths in $L_1$.

Figure 8:
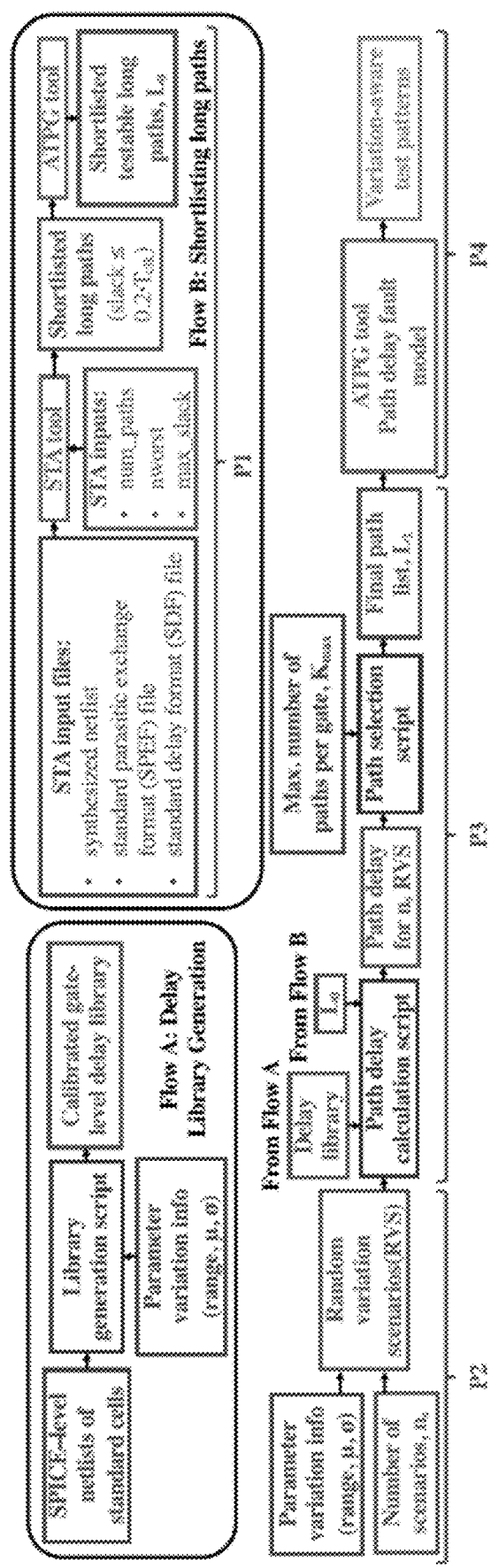
FIG. 8 shows the flowchart of a specific implementation of a longest path selection method (referred to as VADF).

FIG. 8 shows the flowchart of a specific implementation of a longest path selection method (referred to as VADF). The following steps are sequentially performed to obtain the test patterns to detect SDDs in the presence of parameter variations.

To calculate the propagation delay of a path under different process variation scenarios, HSPICE simulations are used to create a delay fault library that stores the propagation delay of all standard cells when the different CNFET parameters are independently varied. In the fabrication process, let $p_1, p_2, \ldots, p_N$ be N parameters that are prone to variations, with $p_i$ varying in the range $\pm n_i\%$ from its nominal value, N $V_i$. Suppose that, for simulation, a step size of $g_i$ % is considered for each parameter. This means that the value of $p_i$ varies in the following steps: $\{[1-(n_i/100)] \cdot N\ V_i, [1-(n_i-g_i/100)] \cdot N\ V_i, [1-(n_i-2g_i/100)] \cdot N\ V_i, \ldots, N\ V_i, \ldots, [1+(n_i-g_i/100)] \cdot N\ V_i, [1+(n_i/100)] \cdot N\ V_i\}$. For a parameter, the total number of steps, $p_i$, is, thus, given by $[(2n_i+1/g_i)]$. For the kth step, 1000 Monte Carlo iterations are performed where the value of $p_i$ is chosen from a random Gaussian distribution with mean, $\mu_{ik}$, as its value in the kth step. Thus, $\mu_{ik}=[1-(n_i-(k-1)g_i/100)] \cdot N\ V_i$. The standard deviation $\sigma_{ik}=0.05 \cdot \mu_{ik}$. During the Monte Carlo iterations, all the other parameters, $p_{j, j \neq i}$, are kept at their nominal values. The mean value of the propagation delay, $PD_{ik}$, is calculated using HSPICE simulation. This single-parameter variation is considered only for the CNFET delay-library generation to reduce the number of HSPICE simulations required.

For Flow A: Delay Library Generation, the total number of Monte Carlo runs is, therefore, given by $\Sigma_{pi}[(2n_i+1/g_i)]$. As mentioned above, five CNFET parameters—CNT diameter, CNT spacing, gate length, gate width, and oxide thickness were considered. For each parameter, $n_i=20$ and $g_i=1$; thus, $(20+20+1)*5=205$ HSPICE simulations are performed per gate. For each gate $G_k$ and parameter $p_i$, the normalized change in the propagation delay (given by $c_{ik}/d_{0k}$), for a $X_{ik}$ % variation from the nominal value is stored in the corresponding delay-library file. The delay fault library is generated once for each standard cell and can be used by all designs synthesized using the same cell library.

In detail, suppose that, in a standard cell $G_k$, the process parameter $p_i$ has a variation of $x_{ik}\%$ from its nominal value u. Using SPICE simulation, the gate delay $d_{ik}$ is obtained under these circumstances and stored in the delay library. The delay contribution of an $x_{ik}\%$ variation in the parameter $p_i$ from its nominal value in the gate $G_k$ is given by $c_{ik} d_{ik} d_{0k}$, where $d_{0k}$ is the nominal gate delay.

In the mth RVS, RVSm, there can be simultaneous variations $X_{ik}$ for multiple process parameters. Under such variations, the delay in gate $G_k$, given by $D_k$, can then be estimated as $D_k = d_{0k} + \Sigma_{pi} c_{ik}$. Note that $c_{ik} = d_{0k}(d_{ik}/d_{0k}-1)$. Note that obtaining the exact value of $D_k$ for any RVS$_m$ requires extensive SPICE simulation for all RVS. This is impractical since the number of possible RVS is exponential in the number of process parameters and the variation range. For example, if there are five parameters, with each parameter varying in the range $\pm 20\%$ from the nominal value with a step size of 1%, the total number of possible RVS per standard cell is $41^5$. Obtaining $D_k$ for all these RVS is impractical, and thus, a model is used to predict the gate delay under any variation scenario.

From FIGS. 5B-5D, it can be seen that $d_{ik}/d_{0k}$ (and therefore $c_{ik}$) is nonlinear in $x_{ik}$ for $d_{CNT}$, s, and $W_g$. Thus, $D_k$ is a nonlinear function of the CNFET device parameters. For the example analysis, the following five CNFET parameters that were shown to have a significant impact on the gate delay are used: carbon nanotube diameter, gate length, dielectric thickness, gate width, and inter-carbon nanotube spacing. It is assumed that each parameter can vary in the range $\pm 20\%$ from its nominal value in steps of 1%.

For Flow B: Shortlisting long paths, the total number of paths in a design scale exponentially with the number of gates. Thus, to reduce runtime, a preliminary shortlist of "long" testable paths is created, denoted by $L_0$. A path is considered to be "long" if the timing slack on the path is a small (user-defined) fraction of the clock period. The final set of paths selected for test generation, denoted by $L_1$, is a subset of $L_0$. To create $L_0$, a commercial static timing analysis (STA) tool is used to obtain an appropriate set of paths in a netlist and shortlisted them based on the following criteria.

Criterion 1: All the paths in $L_0$ have a nominal slack (in the absence of process variations) that is less than a threshold that is determined based on the path profile of the design. Paths with a high slack margin are not considered because SDDs on those paths are unlikely to affect the circuit functionality. For the simulations, paths with nominal slack less than 20% of the clock period are considered.

Criterion 2: All the paths in $L_0$ are ATPG-testable. Using $L_0$, VADF selects a subset $L_1$ of paths that must be tested to cover SDDs at all nodes in the netlist. To ensure the coverage of maximum process variation scenarios, all paths recommended for each node are testable. Note that, here, robust or nonrobust sensitization are not specifically considered. While nonrobust tests are prone to fault-masking, robust tests may fail to detect a delay fault that is detectable by a nonrobust test. A goal is to consider critical paths under most RVSs; therefore, paths are not limited to paths that can be robustly sensitized. In addition, test patterns are generated to sensitize multiple long paths through each fault site. Thus, it is likely that at least one of these long paths will lead to a robust test.

A commercial synthesis tool is first used to insert scan chains in the netlist. Two-step preprocessing is then performed to generate $L_0$ for the scan-inserted netlist.

STA Run: In the first step of the preprocessing flow, the timing characteristics of the design is obtained in the absence of any process variation using a commercial STA tool (Synopsys PrimeTime). To determine the appropriate rated clock period, STA is first run with a 1-ns clock and the slack on the longest path is observed. The clock period is subsequently adjusted for the rest of the flow by considering a 1% positive slack margin for the longest path. For example, suppose that the longest path has a slack $sl_{long}$ ns when a 1-ns rated clock is used. For the rest of the analysis, a clock period given by $t_{clk}$ $1.01 \cdot (1-sl_{long})$ ns is used.

Next, the STA tool is rerun iteratively using a clock with period $t_{clk}$ and the set of longest paths is obtained. In each iteration, the following STA inputs are modified until the number of paths in the list remains constant for consecutive iterations:

num_paths: The maximum number of long paths generated by the STA tool. In the example flow, the starting value of num_paths is equal to the number of instances in the netlist. In each subsequent iteration, the value is increased by 20%.

nworst: The maximum number of paths ending at each scan flop. In the example flow, the starting value of nworst is equal to (number of instances/50). For each subsequent iteration, nworst is increased by 20%.

max_slack: The maximum slack among all the paths generated. In the example flow, the maximum slack is kept fixed at $0.2 \times t_{clk}$.

Shortlisting of Testable Long Paths, $L_0$: After the STA run, path delay faults are added to each path, and using Synopsys TetraMAX, the ATPG-Untestable path-delay faults are identified, and the corresponding paths are removed from the path list. Therefore, all the paths in the final list satisfy both Criterion 1 and Criterion 2.

The longest path selection operations (labeled with P2 and P3 timing identifiers) can begin. The propagation delay of each path in $L_0$ is calculated for a total of ns RVSs. In any given variation scenario, for each gate, the CNFET process parameter $p_i$ is randomly chosen from a Gaussian distribution with mean $\mu_i$ as its nominal value and standard deviation $\sigma_i$ and the distribution truncated in the range $(1-n_i/100)$ $\mu_i$, $(1+n_i/100)$ $\mu_i$. The process parameters for each gate are chosen randomly independent of the placement of the gate; this ensures that both interdie and intradie variations are taken into account. As the selection procedure for paths to detect delay faults is independent of the placement, the proposed method is executed only once, even if there are multiple place-and-route iterations. However, as mentioned previously, all the transistors in a gate have been assumed to have similar variations in any specific scenario.

The CNFET delay fault library is used to calculate the propagation delay of the logic gates under the different variation scenarios. Consider a gate $G_k$ with a nominal delay $d_{0k}$ and process parameters $p_1, p_2, \ldots, p_n$. The delay contribution of the process parameter $p_i$ is given by $C_{ik}$ $d_{ik}$ $d_{0k}$, where $d_{ik}$ is the gate delay in the presence of variation in $p_i$ as obtained from the delay library. The gate delay in the presence of simultaneous variations in CNFET parameters can be approximated by $D=d_{0k}+\Sigma_{pi} c_{ik}$. The total delay of a path in a variation scenario is obtained by adding the gate delays of the standard cells in the path.

Once the delays of the paths in $L_0$ are calculated for the ns scenarios, a subset of paths, $L_1$, is selected for test generation. For each standard cell, the paths through the cell are sequentially added to $L_1$ and removed from $L_0$ in descending order of propagation delay until one of the following happens: 1) $L_1$ contains $\rho_{max}$ paths through the cell and 2) there are no paths through the cell remaining in $L_0$. At this point, the path-selection procedure terminates. The number of iterations for long-path selection is $O(n_s \cdot L_0)$. The actual number of iterations required approaches this limit as $\rho_{max}$ increases.

Finally, test generation for selected long paths can be carried out. a commercial ATPG tool is used in the Launch-on Shift timing mode to generate test patterns to detect delay faults through the selected paths in $L_1$.

Test sets have an inherent tradeoff between the pattern count and effectiveness (here, SDQL). Two experiments are performed to evaluate this tradeoff and the performance of VADF is compared with the Academia Technique and a commercial ATPG tool. Commercial ATPG tools today use sophisticated delay models for efficient pattern generation; Synopsys TetraMAX is used for the commercial SDD ATPG flow.

Experiment E1—Standalone SDD ATPG: In VADF, the test set $TP_A$ is generated for delay faults in all paths on $L_1$ using the path delay fault model in the ATPG tool. Similarly, the ATPG tool is used to generate the test set $TP_B$ for path delay faults in all paths selected by the Academia Technique. The pattern set $TP_C$ is obtained using the commercial SDD ATPG flow where a transition delay fault model is used. As previously described, max_tmgn=$0.2 \cdot t_{clk}$, where $t_{clk}$ is the rated clock period. This ensures SDD detection via long paths. While generating $TP_B$ and $TP_C$ for E1, the ATPG tool is constrained to ensure that $|TP_A|=|TP_B|=|TP_C|$; this results in a comparison between three pattern sets of equal size. $\beta(\theta^-)$ is then computed for 100 random process variation scenarios for the three pattern sets for different F(s).

For each benchmark considered in experiment E1, 100 RVSs are simulated.

The clock frequency and NAND2-equivalent gate count for each benchmark are presented in Table IV. The available gate-level netlists for the Opencores benchmarks (AES, Ethernet, usb_funct, and vga_lcd) are synthesized using the 180-nm GSCLib library. However, the CNFET delay library is created at the 45-nm node; therefore, the benchmark RTLs are synthesized using the 45-nm Nangate Open Cell Library. The OR1200 benchmark is used to show the applicability of the proposed method on large designs. Simulations were performed on a server with 64-GB 1066-MHz RAM and two 2.53-GHz Intel E5630 Xeon CPUs with four cores each.

Table III shows the execution time for pattern generation using VADF with $\rho_{max}=10$.

TABLE III comparison of CPU times

| | VADF | | | | | Commercial |
|---|---|---|---|---|---|---|
| Benchmark | P1 (h) | P2 (h) | P3 (h) | P4 (h) | Total (h) | ATPG Tool (h) |
| AES | 35.96 | 0.08 | 123.37 | 0.94 | 160.35 | 0.07 |
| Ethernet | 5.09 | 0.01 | 6.02 | 0.20 | 11.32 | 0.05 |
| usb_funct | 0.17 | 0.00 | 0.05 | 0.03 | 0.25 | 0.06 |
| Rocketcore | 4.95 | 0.02 | 8.95 | 0.47 | 14.39 | 0.11 |

TABLE III-continued comparison of CPU times

| Benchmark | VADF | | | | | Commercial ATPG Tool (h) |
|---|---|---|---|---|---|---|
| | P1 (h) | P2 (h) | P3 (h) | P4 (h) | Total (h) | |
| vga_lcd | 0.47 | 0.00 | 1.27 | 0.02 | 1.76 | 0.21 |
| OR1200 | 4.17 | 0.03 | 5.69 | 0.02 | 9.91 | 0.43 |

The total CPU time for VADF is divided into the four phases, P1, P2, P3, and P4, as shown in FIG. 8. In particular, based on the steps for longest path selection, the SDD ATPG flow using VADF can be divided into four phases:

P1: Preprocessing step to shortlist long testable paths.
P2: Generating $n_s$ RVS.
P3: Calculate delay of each shortlisted path in $L_0$ for $n_s$ RVS and select the final list of paths $L_1$.
P4: Test generation for selected long paths.

The delay-library generation (Flow A in FIG. 8) is not included in these four phases as it needs to be performed only once for each standard cell library.

The pattern generation time for the commercial ATPG tool for each benchmark is also provided for reference. From the simulation results, it can be seen that P1 and P3 are the major components in the total runtime. This is expected, as finding long paths in a large netlist and calculating their delay under random variations is computationally expensive. Consequently, the CPU time does not necessarily scale with the size of the design but rather with the increasing difficulty of finding long testable paths. This, in turn, depends on the design topology and is difficult to predict without extensive simulations.

The results show that, for most benchmarks, which are of nontrivial sizes, the pattern generation time using VADF is within acceptable limits. The CPU time for AES is significantly higher compared with the other benchmarks; this is due to the large latency associated with identifying the long paths using PrimeTime in P1. Note that the run time for path selection is a one-time investment for a particular design, which can result in a significant reduction in manufacturing test time (due to the reduction in delay fault pattern count).

Moreover, the CPU time reported here is for a modest university-level computational environment and software developed by university researchers; it can conceivably be reduced by an order of magnitude or more in industry settings.

Returning to discussion of the experiment E1, in each scenario, the propagation delays of all "nodes of interest" are modified in the standard delay format (SDF) file. A "node of interest" is one that has at least one path with slack $<0.2 \cdot t_{clk}$ through it. Parameter variations at these nodes affect delays of the critical paths. Short (large-slack) paths are easily sensitized; therefore, a delay test for a node on such paths can sensitize other near-critical paths. However, test patterns targeted toward long paths involve significant justification and backtracking effort; therefore, such patterns are fault-specific and are less likely to sensitize delay faults on other near-critical paths. This results in a degraded SDQL when parameter variations occur because the set of long paths that variation-unaware ATPG tools target may not include the actual long paths under parameter variations. Therefore, variations are injected in the "nodes of interest" to accurately evaluate VADF and the other two test-generation methods, even when the set of long paths changes under variations.

The expected gate delay under CNFET parameter variations is greater than the nominal delay. To ensure this, the delay of all nodes of interest is increased by a positive value chosen from the positive half of a Gaussian distribution with mean, μ 0, and σ=0.05 SDDs can arise due to a number of issues besides CNFET parameter variations—these include resistive shorts and opens, power supply variations, voltage droop, and coupling faults. A Gaussian distribution is considered when inserting random delay faults in the design to demonstrate the performance of test generation methods when multiple sources lead to random SDDs. Fault simulation is then performed for the three test sets obtained using VADF, the Academia Technique (referred to as "[28]" in the Table), and the commercial ATPG tool, with transition delay faults added at the nodes of interest. The mean, $\mu(\tilde{\theta})$, and standard deviation, $\sigma(\tilde{\theta})$, of the SDQL values for the 100 RVSs are then computed. In Table IV, the values of $\mu(\tilde{\theta})$ and $\sigma(\tilde{\theta})$ for different values of $\rho_{max}$ are presented for the benchmarks.

TABLE IV

SDD pattern effectiveness in terms of SDQL (Note [28] is the Academia Technique)

| Benchmark (clock frequency) | Eqv. Gate Count | Test Parttern Count | VADF | | [28] | | Commercial ATPG Tool | |
|---|---|---|---|---|---|---|---|---|
| | | | $\mu(\tilde{\theta})$ (×10⁶) | $\sigma(\tilde{\theta})$ (×10⁶) | $\mu(\tilde{\theta})$ (×10⁶) | $\sigma(\tilde{\theta})$ (×10⁶) | $\mu(\tilde{\theta})$ (×10⁶) | $\sigma(\tilde{\theta})$ (×10⁶) |
| AES (1000 MHz) | 357.6K | (a) 340 | (a) 17.26 | (a) 0.92 | (a) 137.91 | (a) 8.6 | (a) 60.69 | (a) 2.13 |
| | | (b) 570 | (b) 5.82 | (b) 0.04 | (b) 58.45 | (b) 0.45 | (b) 7.65 | (b) 0.06 |
| | | (c) 736 | (c) 7.21 | (c) 0.35 | (c) 22.35 | (c) 0.16 | (c) 9.63 | (c) 0.06 |
| Ethernet (500 MHz) | 99.58K | (a) 542 | (a) 3.00 | (a) 0.02 | (a) 44.04 | (a) 0.29 | (a) 35.67 | (a) 0.32 |
| | | (b) 1008 | (b) 2.14 | (b) 0.01 | (b) 60.15 | (b) 0.37 | (b) 51.11 | (b) 0.31 |
| | | (c) 1010 | (c) 1.67 | (c) 0.01 | (c) 54.45 | (c) 0.38 | (c) 51.73 | (c) 0.36 |
| usb_funct (900 MHz) | 22.79K | (a) 95 | (a) 13.86 | (a) 0.08 | (a) 14.38 | (a) 0.09 | (a) 21.89 | (a) 0.13 |
| | | (b) 171 | (b) 8.02 | (b) 0.07 | (b) 10.21 | (b) 0.08 | (b) 12.59 | (b) 0.10 |
| | | (c) 183 | (c) 8.53 | (c) 0.06 | (c) 9.49 | (c) 0.06 | (c) 10.29 | (c) 0.07 |
| Rocketcore (400 MHz) | 72.99K | (a) 107 | (a) 8.32 | (a) 0.04 | (a) 46.28 | (a) 0.21 | (a) 26.69 | (a) 0.13 |
| | | (b) 272 | (b) 6.61 | (b) 0.03 | (b) 33.73 | (b) 0.16 | (b) 18.55 | (b) 0.09 |
| | | (c) 290 | (c) 6.69 | (c) 0.02 | (c) 35.01 | (c) 0.18 | (c) 17.44 | (c) 0.11 |
| vga_lcd (480 MHz) | 159.06K | (a) 30 | (a) 7.93 | (a) 0.05 | (a) 30.67 | (a) 0.19 | (a) 44.17 | (a) 0.28 |
| | | (b) 117 | (b) 6.78 | (b) 0.04 | (b) 53.97 | (b) 0.34 | (b) 76.44 | (b) 0.48 |
| | | (c) 132 | (c) 6.81 | (c) 0.04 | (c) 49.12 | (c) 0.298 | (c) 68.77 | (c) 0.42 |
| OR1200 (260 MHz) | 1.49M | (a) 37 | (a) 2.41 | (a) 0.01 | (a) 17.69 | (a) 0.05 | (a) 13.29 | (a) 0.04 |
| | | (b) 71 | (b) 1.99 | (b) 0.02 | (b) 18.91 | (b) 0.05 | (b) 12.29 | (b) 0.04 |
| | | (c) 90 | (c) 1.85 | (c) 0.01 | (c) 14.37 | (c) 0.04 | (c) 12.73 | (c) 0.04 |

Here, the SDD distribution function $F(s)=e^{-s}$, for $0 \leq s \leq \infty$, is the default distribution function considered by the ATPG tool. Note that $F(s)$ is a parameter of the process and can assume different distributions. Therefore, in addition to the default $F(s)=e^{-s}$, the SDQL is computed for the three pattern sets assuming $F(s)=1.1\ e^{-1.1s}$. Table V shows the values of $\mu(\tilde{\theta}) \pm \sigma(\tilde{\theta})$ corresponding to the three test sets for $F(s)$ 1.1 $e^{-1.1s}$. The lower value of $\mu(\theta^\sim)$ in the proposed method shows that VADF can be used for efficient SDD testing irrespective of the probability distribution of the defect sizes.

TABLE V

SDD pattern effectiveness

| Benchmark | VADF $\mu(\tilde{\theta}) \pm \sigma(\tilde{\theta})$ (×10$^6$) | [28] $\mu(\tilde{\theta}) \pm \sigma(\tilde{\theta})$ (×10$^6$) | Commercial ATPG Tool $\mu(\tilde{\theta}) \pm \sigma(\tilde{\theta})$ (×10$^6$) |
|---|---|---|---|
| AES | 4.81 ± 0.01 | 47.66 ± 0.08 | 6.32 ± 0.03 |
| Ethernet | 2.23 ± 0.02 | 62.77 ± 0.07 | 53.33 ± 0.05 |
| usb_funct | 6.93 ± 0.05 | 7.74 ± 0.07 | 8.55 ± 0.08 |
| Rocketcore | 6.57 ± 0.02 | 33.55 ± 0.18 | 18.45 ± 0.08 |
| vga_lcd | 6.86 ± 0.01 | 57.84 ± 0.03 | 73.22 ± 0.05 |
| OR1200 | 1.61 ± 0.01 | 13.26 ± 0.04 | 8.57 ± 0.02 |

From Tables IV and V, it can be seen that the test sets generated using VADF provide considerably lower SDQL compared with the other methods across all the benchmarks. Advantageously, VADF can be integrated with commercial ATPG tools to make them CNFET-aware and more effective for CNFET-based designs. Note also that the mean SDQL decreases for all the methods when $\rho_{max}$ increases from 2 to 5. With increasing pmax, the number of paths through each node in $L_0$ increases, thus increasing the likelihood of sensitization via the longest path, which, in turn, decreases SDQL. With an increasing number of paths to be tested, TPA increases, and as a result, TPc is increased to maintain an equal pattern count for a fair comparison. This increase in TPc results in a lower SDQL value obtained using the commercial ATPG tool.

It is observed that for some benchmarks, $\mu(\tilde{\theta})$ increases when pmax is increased from 5 to 10. This happens because, for each VADF run, a set of 1000 independently generated RVS are considered to ensure maximum coverage of SDD sites. These RVS guide the path selection; therefore, it is possible that some of the paths selected with $\rho_{max}$ 5 may not be present in the set of paths selected with $\rho_{max}$ 10. Therefore, it is possible that, for a particular RVS used during fault simulation, the critical path through a fault site is present in the $\rho_{max}$ 5 path set but not in the $\rho_{max}$ 10 path set. The likelihood of such anomalies can be reduced by increasing the number of RVS during path selection. Also, the SDQL of a pattern set can vary with the RVS that is used for fault simulation; for example, SDQL will increase if, in a particular RVS, parameter variations are introduced in hard-to-detect nodes. However, VADF test patterns consistently guarantee more efficient SDD detection compared with the other methods. The CPU time increases with increasing $\rho_{max}$; therefore, the tradeoff between $\mu(\tilde{\theta})$ and CPU time with different values of $\rho_{max}$ can be analyzed to obtain optimal VADF parameters.

Figure 9:
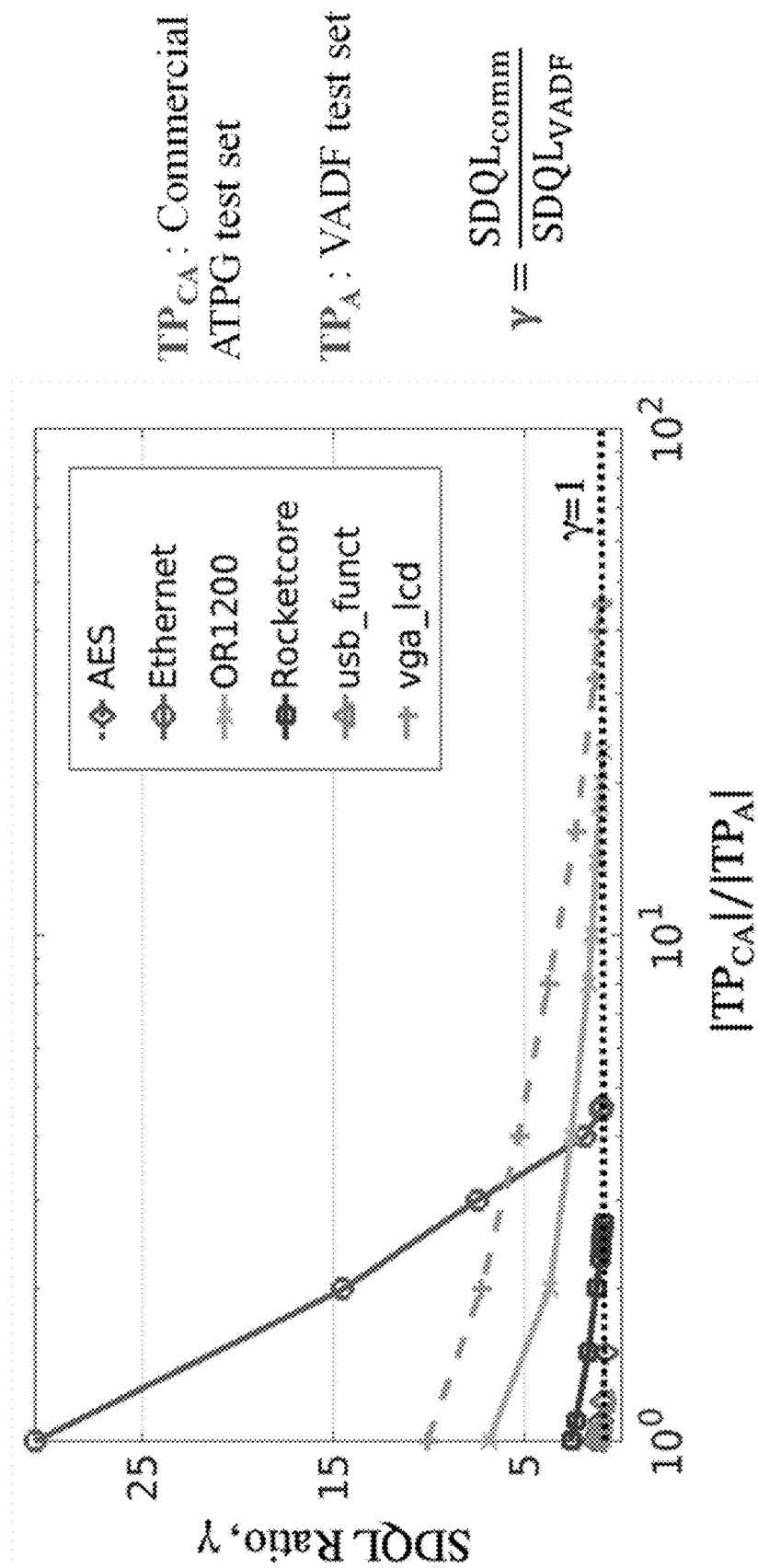
FIG. 9 shows SDQL ratio for variation of pattern count for commercial ATPG SDD test set.

FIG. 9 shows SDQL ratio for variation of pattern count for commercial ATPG SDD test set. The pattern count for commercial SDD ATPG test sets needs to be considerably higher than for VADF to ensure similar SDQL. As shown in FIG. 9, it can be seen how the SDQL ratio $\gamma=\mu(\tilde{\theta}_C)/\mu(\tilde{\theta}_A)$ changes as $|TP_C|/|TP_A|$ increases; $\mu(\tilde{\theta}_C)$ and $\mu(\tilde{\theta}_A)$ denote the mean SDQL of the commercial and VADF pattern sets, respectively. The pattern count for commercial SDD ATPG test sets needs to be considerably higher to ensure similar SDQL ($\gamma \approx 1$). Note that this example was considering SDD test pattern sets; the next example describes comprehensive transition delay test patterns.

Experiment E2—SDD ATPG With Top-Off Timing-Unaware Transition Delay ATPG: In SDD ATPG, the conventional transition delay testing flow is constrained to specifically sensitize paths where the slack margin is less than a threshold (given by max$_{tmgn}$). Finding test patterns for such long paths is often difficult and computationally expensive. As a result, if SDD test patterns are solely used for delay testing, the fault coverage is low. To remedy this, a hybrid approach is used; SDD ATPG targets faults having relatively small slack on the longest paths through them, while timing-unaware transition delay ATPG is used to target the remaining faults along their easiest-to-sensitize paths. In experiment E2, the performance of VADF is compared with the commercial SDD ATPG tool when this hybrid approach is used. For this experiment, TPA generated in experiment E1 is considered. Using ATPG, the top-off pattern set TP$_{A'}$ is generated such that TP*$_A$=TP$_A \cup$ TP$_{A'}$ can detect all testable transition faults. TP$_A$* is, therefore, the comprehensive pattern set generated by VADF for delay fault testing. To compare VADF with conventional CNFET variation-unaware transition delay fault testing, the commercial ATPG tool is first used to generate the test set TPcA. This test set targets SDDs by sensitizing long paths with a slack of $0.2 \times t_{clk}$ or less but is unaware of CNFET variations. Again, using ATPG, the top-off pattern set TP$_{C_A}$ is generated such that TP*$_{CA}$=TP$_{CA'}$ can detect all testable transition faults. Note that, while both TP*$_A$ and TP*$_{CA}$ can detect all transition faults, TP*$_A$ covers SDDs more effectively.

Table VI shows results from experiment E2, where the size (pattern count) of TP*$_A$ is compared with that of the commercial ATPG delay fault test set TP*$_{CA}$.

TABLE VI transition faults testing

| | VADF | | Commercial ATPG | |
|---|---|---|---|---|
| Benchmark | \|TP*$_A$\| | $\mu(\tilde{\theta}*_A)$ (×10$^6$) | \|TP*$_{CA}$\| | $\mu(\tilde{\theta}*_{CA})$ (×10$^6$) |
| AES | 815 | 7.06 | 778 | 8.71 |
| Ethernet | 8489 | 1.66 | 8743 | 23.44 |
| usb_funct | 801 | 8.43 | 755 | 9.53 |
| Rocketcore | 3018 | 5.59 | 4027 | 10.78 |
| vga_lcd | 11510 | 5.07 | 12772 | 6.79 |
| OR1200 | 68424 | 1.66 | 64434 | 9.87 |

For the Ethernet, Rocketcore, and vga_lcd benchmarks, using VADF in the transition fault testing flow results in a smaller pattern count in addition to ensuring effective (low-SDQL) coverage of SDDs. It is found that $|TP*_A|>|TP*_{CA}|$ for the AES, usb_funct, and OR1200 benchmarks; however, the difference in pattern counts is low. Also, test sets generated using VADF offer significantly lower mean SDQL ($\mu(\tilde{\theta}*_{CA})$) compared with commercial test sets ($\mu(\tilde{\theta}*_A)$) for all the benchmarks. This shows that the combination of VADF and timing-unaware transition delay ATPG offers more effective SDD detection compared with the commercial tool with a small increase (and often a decrease) in pattern count. Recall also that, if the commercial tool is used instead of VADF, the total pattern count must be considerably higher to ensure similar SDQL (see FIG. 9).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computer-readable storage medium storing an electronic design automation (EDA) tool that when executed by a computing system, direct the computing system to:
   perform long path selection by:
      generating random variation scenarios, wherein a random variation scenario (RVS) is an instance of an input netlist where values for a set of process parameters for each gate are chosen from a set of values for each process parameter of the set of process parameters for that gate, the set of values being sampled from a distribution of that particular process parameter for that gate and includes a nominal value for that particular process parameter, wherein across different RVSs, the values for the set of process parameters are independently chosen for each gate in a path;
      calculating a total delay through a path for each RVS; and
      selecting a number of paths having highest total delays for each fault site under random variations of the RVSs, wherein the number of paths is at least two paths having the highest total delays; and
   generate delay test patterns for each of the selected paths for each fault site.

2. The computer-readable storage medium of claim 1, wherein instructions to perform the long path selection further direct the computing system to:
   receive input of a maximum number of paths to be considered through each potential fault site, the maximum number of paths being the number of paths, when available, for selection during the selecting the number of paths having the highest total delays for each fault site;
   receive input of a total number of RVS to simulate for each path; and
   access mapping data structures for process variation specifications of each standard cell from which the values for the set of process parameters are randomly chosen for each RVS, each mapping data structure indicating the nominal value and the distribution for each particular process parameter of the set of process parameters for each gate.

3. The computer-readable storage medium of claim 1, further comprising instructions that direct the computing system to:
   identify a shortlist of long paths from the input netlist, the shortlist of long paths comprising paths through each potential fault site having a nominal slack in an absence of process variations that is less than a threshold and being a real path testable by a test pattern,
   wherein the long path selection is performed for each path of the shortlist of long paths.

4. The computer-readable storage medium of claim 1, further comprising instructions for delay library generation that when executed by the computing system, direct the computing system to:
   receive a netlist of a standard cell for the EDA tool;
   create a mapping data structure for the standard cell that stores a set of variations of a nominal parameter value across a range of variation for a set of parameters associated with a device or devices forming the standard cell;
   perform a set of simulations of propagation delay for the standard cell, each simulation of the set of simulations being a group of simulations for a corresponding independently varied parameter of the set of parameters;
   calculate a mean value of an increase in propagation delay from the group of simulations for each parameter and corresponding variation from the nominal parameter value; and
   store the mean value of the increase in the propagation delay for each parameter and corresponding variation from the nominal parameter value in the mapping data structure,
   wherein the values for the set of process parameters for each gate are chosen from a corresponding mapping data structure for the standard cell associated with that gate.

5. The computer-readable storage medium of claim 4, wherein the mean value of the increase in propagation delay due to each parameter variation is used to calculate the total delay through the path for each RVS.

6. The computer-readable storage medium of claim 4, wherein the device or devices for the standard cell comprises a carbon nanotube field effect transistor.

7. The computer-readable storage medium of claim 6, wherein the set of parameters include at least one parameter selected from the group consisting of carbon nanotube diameter, gate length, dielectric thickness, gate width, and inter-carbon nanotube spacing.

8. The computer-readable storage medium of claim 4, wherein the mapping data structure is a look up table.

9. The computer-readable storage medium of claim 1, wherein instructions to generate delay test patterns for each of the selected paths for each fault site are part of an automated test pattern generation tool.

10. A method comprising:
   identifying a shortlist of long paths from an input netlist, the shortlist of long paths comprising paths through each potential fault site having a nominal slack in an absence of process variations that is less than a threshold and being a real path testable by a test pattern;
   for each path of the shortlist of long paths, performing long path selection by:
      generating a specified number of random variation scenarios, wherein a random variation scenario (RVS) is an instance of the input netlist where values for a set of process parameters for each gate in the path are chosen from a set of values for each process parameter of the set of process parameters for that gate, the set of values being sampled from a distribution of that particular process parameter for that gate and includes a nominal value for that particular process parameter, wherein across different RVSs, the values for the set of process parameters are independently chosen for each gate in the path;
      calculating a total delay through the path for each RVS of the specified number of RVSs; and
      selecting a number of paths having highest total delays for each fault site under random variations of the RVSs, wherein the number of paths is at least two paths having the highest total delays; and
   generating delay test patterns for each of the selected paths for each fault site.

11. The method of claim 10, further comprising:
receiving input of the specified number of RVSs to simulate for each path; and
receiving input of a maximum number of paths to be considered through each potential fault site, the maximum number of paths being the number of paths, when available, for selection during the selecting the number of paths having the highest total delays for each fault site.

12. The method of claim 10, further comprising:
accessing mapping data structures for process variation specifications of each standard cell from which the values for the set of process parameters are randomly chosen for each RVS, each mapping data structure indicating the nominal value and the distribution for each particular process parameter of the set of process parameters for each gate.

13. The method of claim 12, further comprising:
generating a delay library of the mapping data structures by:
receiving a netlist of a standard cell;
creating a corresponding mapping data structure for the standard cell that stores a set of variations of a nominal parameter value across a range of variation for a set of parameters associated with a device or devices forming the standard cell;
performing a set of simulations of propagation delay for the standard cell, each simulation of the set of simulations being a group of simulations for a corresponding independently varied parameter of the set of parameters;
calculating a mean value of an increase in propagation delay from the group of simulations for each parameter and corresponding variation from the nominal parameter value; and
storing the mean value of the increase in the propagation delay for each parameter and corresponding variation from the nominal parameter value in the mapping data structure,
wherein the values for the set of process parameters for each gate are chosen from the corresponding mapping data structure for the standard cell associated with that gate.

14. The method of claim 13, wherein the mean value of the increase in propagation delay due to each parameter variation is used to calculate the total delay through the path for each RVS.

15. The method of claim 13, wherein the device or devices for the standard cell comprises a carbon nanotube field effect transistor.

16. The method of claim 15, wherein the set of parameters include at least one parameter selected from the group consisting of carbon nanotube diameter, gate length, dielectric thickness, gate width, and inter-carbon nanotube spacing.

17. The method of claim 13, wherein the mapping data structure is a look up table.

18. The method of claim 10, wherein the delay test patterns are generated by an automated test pattern generation tool.

19. A system comprising:
a processor;
memory;
a delay library stored on the memory, the delay library comprising mapping data structures, each mapping data structure indicating a nominal value and a distribution for each particular process parameter of a set of process parameters for each gate; and
instructions for an electronic design automation tool stored on the memory that when executed by the processor, direct the processor to:
perform long path selection by:
generating random variation scenarios, wherein a random variation scenario (RVS) is an instance of an input netlist where values for the set of process parameters for each gate are chosen from a set of values for each process parameter of the set of process parameters for that gate stored in the delay library, wherein across different RVSs, the values for the set of process parameters are independently chosen for each gate in a path;
calculating a total delay through a path for each RVS; and
selecting a number of paths having highest total delays for each fault site under random variations of the RVSs, wherein the number of paths is at least two paths having the highest total delays; and
generate delay test patterns for each of the selected paths for each fault site.

20. The system of claim 19, further comprising instructions for delay library generation stored on the memory that when executed by the processor, direct the processor to:
receive a netlist of a standard cell for the EDA tool;
create a mapping data structure for the standard cell that stores a set of variations of a nominal parameter value across a range of variation for a set of parameters associated with a device or devices forming the standard cell;
perform a set of simulations of propagation delay for the standard cell, each simulation of the set of simulations being a group of simulations for a corresponding independently varied parameter of the set of parameters;
calculate a mean value of an increase in propagation delay from the group of simulations for each parameter and corresponding variation from the nominal parameter value; and
store the mean value of the increase in the propagation delay for each parameter and corresponding variation from the nominal parameter value in the mapping data structure for the delay library.

* * * * *